US010438156B2

(12) United States Patent
Swanson et al.

(10) Patent No.: US 10,438,156 B2
(45) Date of Patent: Oct. 8, 2019

(54) SYSTEMS AND METHODS TO PROVIDE TRAINING GUIDANCE

(71) Applicant: Aptima, Inc., Woburn, MA (US)

(72) Inventors: Leah Swanson, Beavercreek, OH (US); Kristy Reynolds, Billings, MT (US); Michael Garrity, Londonderry, NH (US); Tiffany Poeppelman, Centerville, OH (US); Michael Keeney, Sterling, VA (US); Alan Carlin, Arlington, MA (US); Danielle Dumond, Haverhill, MA (US); Yale Marc, Winchester, MA (US)

(73) Assignee: APTIMA, INC., Woburn, MA (US)

( * ) Notice: Subject to any disclaimer, the term of this patent is extended or adjusted under 35 U.S.C. 154(b) by 914 days.

(21) Appl. No.: 14/207,684

(22) Filed: Mar. 13, 2014

(65) Prior Publication Data

US 2014/0278833 A1 Sep. 18, 2014

Related U.S. Application Data

(60) Provisional application No. 61/779,978, filed on Mar. 13, 2013, provisional application No. 61/810,337, (Continued)

(51) Int. Cl.
*G06Q 10/06* (2012.01)
(52) U.S. Cl.
CPC .............. *G06Q 10/06398* (2013.01)
(58) Field of Classification Search
USPC .............................................. 705/7.11–7.42
See application file for complete search history.

(56) References Cited

U.S. PATENT DOCUMENTS

| 6,212,510 | B1 | 4/2001 | Brand |
| 8,467,599 | B2 | 6/2013 | El Dokor |

(Continued)

FOREIGN PATENT DOCUMENTS

| JP | 2007328507 | 12/2007 |
| WO | 2009/114649 | 9/2009 |
| WO | 2010038156 | 4/2010 |

OTHER PUBLICATIONS

Anker, T., D. Dolev, and B. Hod "Belief Propagation in Wireless Sensor Networks—A Practical Approach", Proceedings of the 3rd International Conference on Wireless Algorithms, Systems, and Applications, Oct. 26-28, 2008, pp. 466-479, 5258, 14 pgs, Springer Berlin Heidelberg, Dallas Texas, USA.

(Continued)

*Primary Examiner* — Amber A Misiaszek
(74) *Attorney, Agent, or Firm* — John J. Brooks III

(57) ABSTRACT

Systems and methods to provide a training solution for a trainee are disclosed. In some embodiments the method comprises receiving a training requirement comprising a training outcome and a training configuration wherein the training configuration defines a trainee state, determining a training environment based on a relevancy function of the training environment to the training outcome, determining a training content based on a relationship function of the training content to the trainee state and determining a training solution comprising the training environment and the training content. In some embodiments, the relationship function comprises a POMDP model and the relevancy function comprises a best fit curve.

12 Claims, 11 Drawing Sheets

Related U.S. Application Data filed on Apr. 10, 2013, provisional application No. 61/780,167, filed on Mar. 13, 2013, provisional application No. 61/788,185, filed on Mar. 15, 2013.

(56) References Cited

U.S. PATENT DOCUMENTS

| | | | |
|---|---|---|---|
| 8,655,822 B2 | 2/2014 | Levchuk et al. | |
| 2002/0046202 A1* | 4/2002 | Honda | G09B 7/00 |
| 2002/0064766 A1* | 5/2002 | Cozens | G09B 5/02 434/350 |
| 2002/0133391 A1 | 9/2002 | Johnson | |
| 2004/0015386 A1 | 1/2004 | Abe et al. | |
| 2004/0117624 A1 | 6/2004 | Brandt et al. | |
| 2006/0184471 A1 | 8/2006 | Minamino et al. | |
| 2006/0200333 A1 | 9/2006 | Dalal et al. | |
| 2006/0224535 A1 | 10/2006 | Chickering | |
| 2006/0248026 A1 | 11/2006 | Aoyama et al. | |
| 2008/0260212 A1 | 10/2008 | Moskal et al. | |
| 2010/0010943 A1 | 1/2010 | Ito et al. | |
| 2010/0010948 A1 | 1/2010 | Ito et al. | |
| 2011/0016067 A1 | 1/2011 | Levchuk et al. | |
| 2011/0211163 A1 | 9/2011 | Meuse et al. | |
| 2011/0214006 A1 | 9/2011 | Meek et al. | |
| 2012/0076416 A1 | 3/2012 | Castellanos et al. | |
| 2012/0254333 A1 | 10/2012 | Chandramouli et al. | |
| 2013/0288222 A1* | 10/2013 | Stacy | G09B 5/00 434/362 |
| 2014/0087352 A1 | 3/2014 | Hillier et al. | |
| 2014/0278833 A1* | 9/2014 | Swanson | G06Q 10/06398 705/7.42 |
| 2015/0317589 A1 | 11/2015 | Anderson et al. | |

OTHER PUBLICATIONS

Crick, C., A. Pfeffer "Loopy Belief Propagation as a Basis for Communication in Sensor Networks", UAI'03 Proceedings of the Nineteenth conference on Uncertainty in Artificial Intelligence, Aug. 7, 2002, pp. 159-166, 8 pgs., Morgan Kaufmann Publishers Inc. San Francisco, CA, USA.
Elidan, G., I. McGraw, and D. Koller "Residual belief propagation: Informed Scheduling for Asynchronous Message Passing", Proceedings of the Twenty-second Conference on Uncertainty in AI (UAI), 2006, pp. 165-173, 9 pgs., AUAI Press, Boston, MA, USA.
Haupt, J., W. U. Bajwa, M. Rabbat, and R. Nowak "Compressed Sensing for Networked Data", IEEE Signal Processing Magazine, Mar. 2008, pp. 92-101, 10 pgs., vol. 25, IEEE, New York, NY, USA.
Malewicz, G., M. Austern, A. Bik, J. Dehnert, I. Horn, N. Leiser, and G. Czajkowski "Pregel: a system for large-scale graph processing", Proceedings of the 2010 ACM SIGMOD International Conference on Management of data, Jun. 6-11, 2010, pp. 135-146, 11 pgs., ACM, New York, NY, USA.
Pfeffer, A., T. Tai "Asynchronous Dynamic Bayesian Networks", Proceedings of the Twenty-First Conference on Uncertainty in Artificial Intelligence, Jul. 26-29, 2005, pp. 467-476, 10 pgs., AUAI Press, Arlington, VA, USA.
Sutton, C., and A. McCallum "Improved Dynamic Schedules for Belief Propagation", Proceedings of the Twenty-third Conference on Uncertainty in Artificial Intelligence (UAI), Jul. 19-22, 2007, pp. 376-383, 8 pgs., AUAI Press, Boston, MA, USA.
Brocheler, M., A. Pugliese, V. P. Bucci, and V. S. Subrahmanian "COSI: Cloud oriented subgraph identification in massive social networks", International Conference on Advances in Social Networks Analysis and Mining, Aug. 9-11, 2010, pp. 248-255, 8 pgs., IEEE, New York, NY, USA.
Bertsekas, D., R. Gallager "Data Networks", 2nd edition, 1992, pp. 432-447. 16 pgs., Prentice-Hall Inc., Upper Saddle Rive, New Jersey, USA.
Cassandra, A. (1998). A survey of POMDPS applications. American Association for Artificial Intelligence Symposium, Austin Texas, USA. 9 pgs.
Elliott, L.R., Cardenas, R., and Schiflett, S.G., 1999, Measurement of AWACS team performance in distributed mission scenarios. Available online at: http://www.dodccrp.org/1999ccrts/pdf_files/track_3/013ellio.pdf (accessed Aug. 28, 2003), Texas, USA. 18 pgs.
Ericsson, K.A., 2002, Attaining excellence through deliberate practice: Insights from the study of expert performance. In the Pursuit of Excellence Through Education, M. Ferrari (Ed.), (Mahwah, NJ: Lawrence Erlbaum Associates, 2002), New Jersey, USA. 20 pgs.
Ericsson, K.A., 2004, Deliberate practice and the acquisition and maintenance of expert performance in medicine and related domains. Academic Medicine, 79, pp. S70-S81, USA. 20 pgs.
Ericsson, K.A., Krampe, R. TH., and Tesch-Romer, C., 1993, The role of deliberate practice in the acquisition of expert performance. Psychological Review, 700, p. 379 and p. 384., USA. 44 pgs.
Fahey, R.P., Rowe, A.L., Dunlap, K.L., and Deboom, D.O., 2000, Synthetic task design (1): Preliminary cognitive task analysis of AWACS weapons director teams. Technical Report. Brooks AFB, TX: Armstrong Laboratory, 59 pgs.
Levchuk, G.M., Gildea, K., Freeman, J., Shebilski, W., Alakke, G. and Narakesari, S., Abstract for CCRTS2007, Title: Benchmarked Experiential System for Training (BEST), presented Jun. 19-21, 2007 in Newport RI, 6 pgs.
Shebilski, W., Gildea, K., Freeman, J. and Levchuk, G., Abstract for HFES2007 Conference, Title: Training Experienced Teams for New Experiences, presented at conference Oct. 1-5, 2007 in Baltimore MD, 5 pgs.
PCT International Preliminary Report on Patentability, PCT/US2009/036865 filed Mar. 11, 2009, dated Sep. 14, 2010, Switzerland. 5 pgs.
PCT International Search Report, PCT/US2009/0368653 filed Mar. 11, 2009, dated Nov. 6, 2009, Korea. 3 pgs.
Daniel Pellett, Office Action Detail for U.S. Appl. No. 12/921,755, filed Sep. 9, 2010, dated Apr. 2, 2013, USA. 22 pgs.
R. Nair, D. Pynadath, M. Yokoo, M. Tambe, and S. Marsella, "Taming decentralized POMDPs: Towards efficient policy computation for multiagent settings," in Proceedings of the Eighteenth International Joint Conference on Artificial Intelligence (IJCAI-03), 2003, Mexico. 7 pgs.
N. Schurr, J. Marecki, J.P. Lewis, M. Tambe, and P. Scerri. The DEFACTO system: Training tool for incident aommanders. In IAAI'05, 2005, USA. 8 pgs.
J. Yen, J. Yin, T. Loerger, M. Miller, D. Xu, and R. Volz. CAST: Collaborative agents for simulating teamwork. In Proceedings of International Joint Conference on Artificial Intelligence, 2001, USA. 8 pgs.
Jaakkola, T., Singh, S. P., Jordan, M. I. (1995) Reinforcement learning algorithms for partially observable Markov decision problems, Cambridge, MA, USA. 8 pgs.
X. Fan, J. Yen, "Modeling and simulating human teamwork behaviours using intelligent agents," in Physics of Life Reviews 1 (2004), pp. 173-201, University Park, PA, USA. 29 pgs.
Daniel Pellett, Notice of Allowance for U.S. Appl. No. 12/921,755, filed Sep. 9, 2010, dated Aug. 26, 2013, 19 pgs., USPTO.
Daniel Pellett, Office Action Detail for U.S. Appl. No. 14/143,410, filed Dec. 30, 2013, dated Apr. 19, 2016, 29 pgs., USPTO.
Gonzales-Brenes, Jose P. and Mostow, Jack. Dynamic Cognitive Tracing: Towards Unified Discovery of Student and Cognitive Models. International Educational Data Mining Society, Paper presented at the International Conference on Educational Data Mining (EDM) (5th, Chania, Greece, Jun. 19-21, 2012). Project Listen—Carnegie Mellon University , 8 pgs.
Chi, Min; Koedinger, Kenneth; Gordon, Geoff; Jordan, Pamela and Vanlehn, Kurt. Instructional Factors Analysis: A Cognitive Model for Multiple Instructional Interventions. Proceedings of the 4th International Conference on Educational Data Mining. Eindhoven, the Netherlands. 2011, 10 pgs.
Utama,Robert J., Office Action Detail for U.S. Appl. No. 13/872,519, filed Apr. 29, 2013, dated Dec. 7, 2015, USPTO. 10 pgs.
Utama, Robert J., Office Action Detail for U.S. Appl. No. 13/872,519, filed Apr. 29, 2013, dated Jun. 20, 2016, USPTO. 11 pgs.
Daniel Pellett, Office Action Detail for U.S. Appl. No. 14/143,410, filed Dec. 30, 2013, dated May 19, 2017, 15 pgs., USPTO.
Daniel Pellett, Advisory Action Detail for U.S. Appl. No. 14/143,410, filed Dec. 30, 2013, dated Aug. 22, 2017, 5 pgs., USPTO.

(56) References Cited

OTHER PUBLICATIONS

Daniel Pellett, Advisory Action Detail for U.S. Appl. No. 14/143,410, filed Dec. 30, 2013, dated Oct. 19, 2017, 19 pgs., USPTO.
Daniel Pellett, Office Action Detail for U.S. Appl. No. 14/143,410, filed Dec. 30, 2013, dated Mar. 12, 2018, 26 pgs., USPTO.
Utama, Robert J., Advisory Action Detail for U.S. Appl. No. 13/872,519, filed Apr. 29, 2013, dated Sep. 7, 2016, 6 pgs., USPTO.
Utama, Robert J., Examiners Answer to Appeal Brief for U.S. Appl. No. 13/872,519, filed Apr. 29, 2013, dated Feb. 7, 2017, 17 pgs., USPTO.
Hall, Shauna-Kay., Office Action Detail for U.S. Appl. No. 15/395,574, filed Dec. 30, 2016, dated Aug. 8, 2018, USPTO. 14 pgs.
Pellett, Daniel, Advisory Action Detail for U.S. Appl. No. 14/143,410, filed Dec. 30, 2013, dated Jun. 12, 2018, 6 pgs., USPTO.
Hall, Shauna-Kay., Office Action Detail for U.S. Appl. No. 15/395,574, filed Dec. 30, 2016, dated May 15, 2019, USPTO. 10 pgs.
Almond, Russell G. An illustration of the use of Markov decisions porcesses to represent student growth (learning): ETS Research Report Series 2007.2 (2007): 1-61. (Year:2007).
Kaelbling, Leslie Pack, et all. "Planning and acting in partially oberservable stochastic domains." Artificial Intelligence 101.1-2 (1998): 99-134. (Year: 1998).
Pellett, Daniel, Advisory Action Detail for U.S. Appl. No. 14/143,410 filed Dec. 30, 2013, dated Jul. 30, 2019, 28 pgs., USPTO.

* cited by examiner

SYSTEMS AND METHODS TO PROVIDE TRAINING GUIDANCE

CROSS-REFERENCE TO RELATED APPLICATIONS

This application claims the benefit of: U.S. Pat. App. No. 61/788,185, filed on Mar. 15, 2013, entitled "SYSTEMS AND METHODS FOR DETERMINING A RELATIONSHIP"; U.S. Pat. App. No. 61/779,978, filed on Mar. 13, 2013, entitled "SYSTEMS AND METHODS TO DETERMINE ADAPTIVE LEARNING PATHS"; U.S. Pat. App. No. 61/810,337, filed on Apr. 10, 2013, entitled "DISTRIBUTED SENSING AND PROCESSING ADAPTIVE COLLABORATIVE ENVIRONMENT"; and U.S. Pat. App. No. 61/780,167, filed on Mar. 13, 2013, entitled "INTELLIGENT TUTORING SYSTEMS AND METHODS"; the entire contents of all these applications are incorporated herein by reference.

STATEMENT REGARDING FEDERALLY SPONSORED RESEARCH OR DEVELOPMENT

This invention was made with Government support under Contract No. FA8650-12-M-6292 and Contract #FA8650-12-M-6261 awarded by the U.S. Air Force, Contract No. N00014-12-M-0102 awarded by the U.S. Navy and Contract No. N000014-10-C-0442 awarded by the U.S. Navy and Contract No. FA8650-10-C-6060 awarded by the U.S. Air Force. The U.S. Government has certain rights in the invention.

BACKGROUND OF THE SUBJECT INVENTION

Field of the Invention

Embodiments of the disclosed systems and methods to provide training guidance are related to automated methods of determining training solutions to users based on training requirements. In particular, some embodiments determine training solutions based on mathematical relationships between the possible training solutions and the training requirements.

Background

In the field of training management, it is known that there is a problem in training effectively and developing organizational members. Avoidable costs are incurred when training is needlessly duplicated, using content that trainees may not need, or training takes place in an environment that is unsuitable for satisfying key training objectives. There is no clear mechanism to reduce duplication of training content, to streamline content that will be presented, to select a training environment that is most conducive to learning, or to adapt trainee experiences for various levels of competence across various domains. In addition, training content, environments (that is, how the training content is presented, such as through simulators or computer-based training), and learning objectives evolve over time with the development of new technological capabilities, enhanced agency missions, and requisite competencies. These challenges make it difficult to understand and identify optimal training paths that will help to achieve desired outcomes (i.e., which combination of training environments, training events, content, and experiences are best suited for training the needs of each specific individual). Furthermore, there exists a need to apply information about an individual's performance during training to make optimal decisions for future training content.

Solutions that have been used to address this problem include a variety of training effectiveness evaluations to understand how certain devices or training content prepare trainees for the operational environment and mission. Traditionally, these evaluations have included expert judgments regarding the relationships between a particular training device, environment, or content and desired training outcomes. However, expert judgments often fail to align the relationships with objective outcomes. Previous solutions also lack the ability to comprehensively evaluate training content in terms of which training environments or characteristics are best suited to train specific learning objectives.

In addition, previous solutions lack the specificity and an understanding of the relationships among the data that is required to tailor training to the individual. Instead, these solutions only manage the scheduling of courses and identifying the role for which the course is suited. Prior solutions fail to account for each individual's competencies and identify custom solutions to fill gaps in competencies as well as to suggest the capabilities that an environment or course must possess in order to attain the desired outcomes.

BRIEF SUMMARY OF THE SUBJECT INVENTION

The following summary is included only to introduce some concepts discussed in the Detailed Description below. This summary is not comprehensive and is not intended to delineate the scope of protectable subject matter, which is set forth by the claims presented at the end.

One example embodiment of the systems and methods of provide training guidance addresses shortcomings found in existing methods by providing a flexible, mathematical model-based decision support, adaptive training capability. This capability will provide training stakeholders with efficient, data-driven training recommendations that quickly and efficiently suggest training content and environments that are best suited to meet the individual's needs and effectively achieve learning objectives.

In some example embodiments, a computer based method to determine a training solution for a trainee is provided comprising receiving a training requirement comprising a training outcome and a training configuration, the training configuration defining a trainee state, determining a training environment based on a relevancy function of the training environment to the training outcome, determining a training content based on a relationship function of the training content to the trainee state and determining a training solution comprising the training environment and the training content. In some embodiments, the training outcome is selected from a plurality of predetermined training outcomes, the relevancy function defining a relevancy value for each of the predetermined training outcomes to each of a plurality of the training environments and determining the training environment based on a relevancy function of the training environment to the training outcome comprises selecting the training environment having the highest relevancy value to the training outcome. In some embodiments, the step of selecting the training outcome from a plurality of predetermined training outcomes comprises selecting the training configuration from a list of predetermined training configurations and each of the predetermined training configurations having a relevancy value to each of the plurality of training outcomes whereby selecting the training configuration selects the training outcome. In some embodiments, the relevancy function comprises a best fit curve. In some embodiments, the training requirement comprises one selected from a group of predetermined training requirements consisting of: a platform, a role and experience, a training type and an experience. In some embodiments, the training outcome comprises one selected from a group of predetermined training requirements consisting of: a competency, a knowledge and skill, and a training content. In some embodiments, the training configuration is selected from a plurality of predetermined training configurations, the relationship function defining a relationship value for each of the predetermined training configurations to each of a plurality of the training contents and determining the training content based on a relationship function of the training content to the training configurations comprises selecting the training content having the highest relationship value to the training configuration. In some embodiments, the training configuration is selected from a plurality of predetermined training configurations, the relationship function defining a relationship value for each of the predetermined training configurations to each of a plurality of the training contents and determining the training content based on a relationship function of the training content to the training configurations comprises selecting the training content having the highest relationship value to the training configuration. In some embodiments, the highest relationship value to the training configuration is defined by relationship function of the training content and the training configuration and the relationship function comprises a POMDP model.

In some embodiments, a computer based method to determine a training content for a trainee is provided comprising receiving a training requirement comprising a training outcome and a training configuration, the training configuration defining a trainee state and determining a training content based on a relationship function of the training content to the trainee state. In some embodiments, the training configuration is selected from a plurality of predetermined training configurations, the relationship function defining a relationship value for each of the predetermined training configurations to each of a plurality of the training contents and determining the training content based on a relationship function of the training content to the training configurations comprises selecting the training content having the highest relationship value to the training configuration. In some embodiments, the highest relationship value to the training configuration is defined by the relationship function of the training content and the training configuration and the relationship function comprises a POMDP model.

In some embodiments, the method further comprises receiving a trainee performance value of the trainee, one of the plurality of predetermined training configurations comprising a trainee state and updating the trainee state to an updated trainee state using the relationship function and the trainee performance value.

In some embodiments, the method further comprises receiving a performance value of the training solution and updating the relevancy function using a machine learning technique and the performance value.

In some embodiments, the method further comprises receiving a performance value of the training solution and updating the relationship function using a machine learning technique and the performance value.

In some embodiments, a training guidance system for determining a training solution is provide, the training guidance system comprising a processor, a non-transitory computer readable medium having a computer readable program code embodied therein, said computer readable program code configured to be executed to implement the disclosed methods to determine a training solution or a training content for a trainee.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE SUBJECT INVENTION

Systems and methods to provide training guidance will now be described in detail with reference to the accompanying drawings. It will be appreciated that, while the following description focuses on a system that determines content and environments for trainees, the systems and methods disclosed herein have wide applicability. Notwithstanding the specific example embodiments set forth below, all such variations and modifications that would be envisioned by one of ordinary skill in the art are intended to fall within the scope of this disclosure.

As used herein, in addition to the normal meaning in the art of mathematical modeling and training, the following terms are also to be interpreted with the following meanings.

The term characteristics or training characteristics are defined as features (e.g., fidelity, accessibility, constructive feedback) of a particular training environment or device that may support or abate effective learning. For example, the characteristics represent characteristics of training content (e.g., olfactic fidelity, facial expressions), training environments (e.g., weapons model), and logistics (e.g., portability, technological support), all of which include both traditional and non-traditional features.

The term environment or training environment means settings, methods, or situations that provide opportunity for trainees to experience devices and activities that must be included in training/instructional training content appropriately to achieve specified particular training goals, competencies, learning objectives, and training/instructional content.

The term content or training content means any developmental events during training or career or both necessary to gain knowledge or skills, or practice a competency under operational conditions.

The term competency or training competency means the behaviors, knowledge, skills, and abilities that are necessary for successful job performance.

Figure 1:
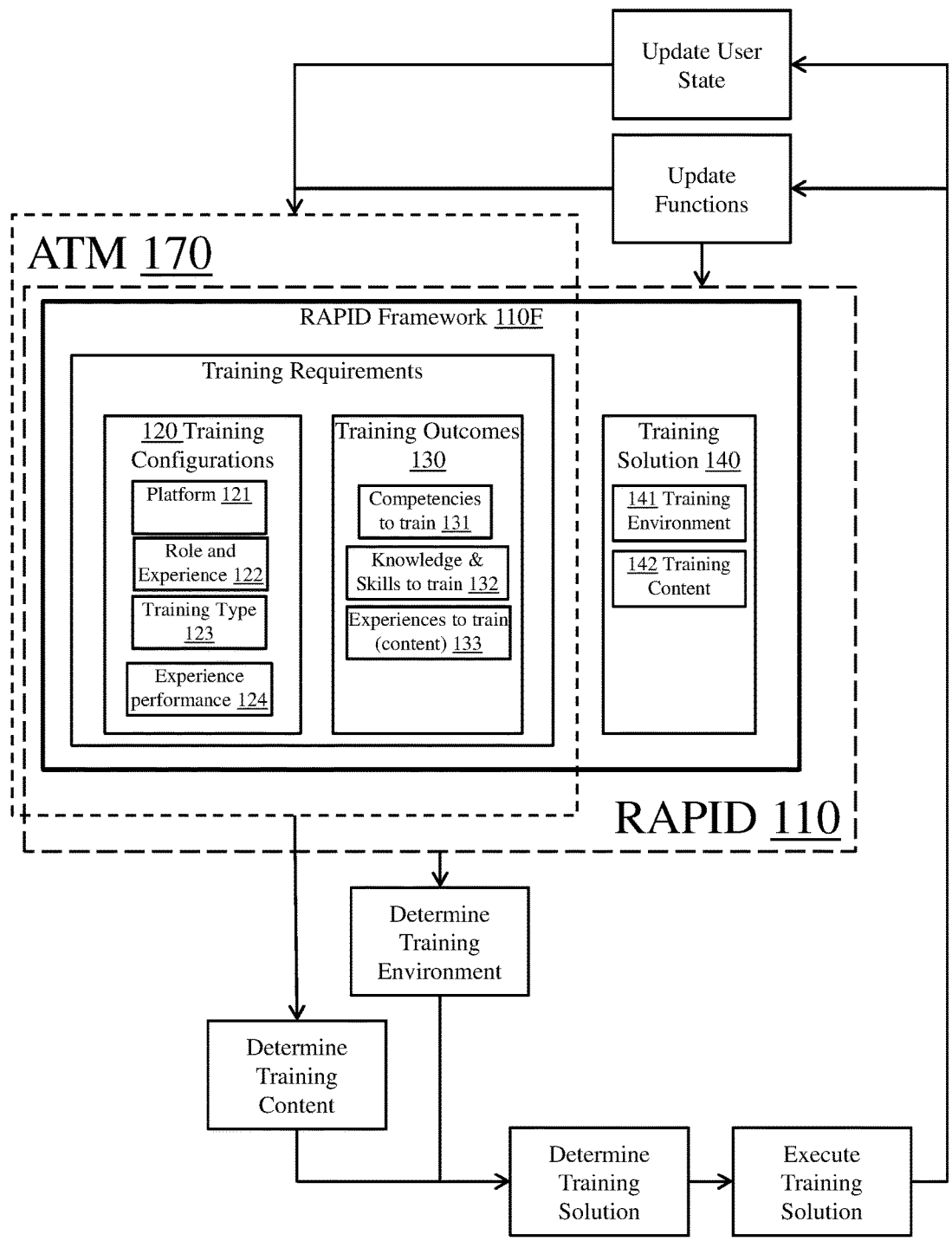
FIG. 1 illustrates a process diagram illustrating the general concepts of one example embodiment of the invention and showing the general contributions of the RAPID Subsystem and the ATM Subsystem.

The systems and methods disclosed are generally the result of two separate, but related subsystems as shown in FIG. 1. One subsystem, the Realistic Assessment of Performance in Devices (RAPID) subsystem 110, provides some of the underlying organization framework of the solution as well as provides data analysis tools to build relationships of data in the framework and provide recommendations on training environments based on training requirements. The other subsystem, the Adaptive Training Management (ATM) subsystem 170, provides trainee profile and state evaluation tools, Partially-Observable Markov Decision Processes (POMDP) sequencing and provides recommendations on courses or training content for the trainee.

When used together, these two components are able to recommend a training solution that includes training content and a training environment. When used together, these two components are also able to provide ongoing and refined training solutions as the trainee progresses through training. Together, the training guidance system leverages past training performance data, relationships between training requirements and desired outcomes, current role requirements (i.e., expected behavior upon training completion) and the knowledge, skills, and abilities that the individual already possesses via ATM's trainee profile and state evaluator to make its recommendations. The system considers the interaction among the requirements that describe the training environment (RAPID) and provides remedial training recommendations when trainee's current state does not align with their desired state (ATM).

Furthermore, the systems and methods are innovative in the way they work to produce recommendations that guide and optimize learning paths. The concept of developing a profile for each trainee and addressing each of his or her roles enables quick and efficient identification of the requisite knowledge and skills to produce desired behaviors (ATM). Overlap may exist among several roles, so the system identifies and selects the highest level on which to train the individual, based on his or her set of role profiles, and avoids duplicated training at lower levels. For example, suppose an individual fills roles as both a project team member and as a supervisor. Suppose also that the supervisor role requires greater expertise in time management than does the team member role, and that the supervisor training course provides training in time management at the required high level. The ATM system may identify the time management skill shortfall in both roles, recommend the supervisor training course as the environment best suited to support learning to fill the (higher level) time management skill shortfall, and credit the team member for this training at the (lower-level) team member role requirement. The ATM recommendations may also integrate considerations of costs and scheduling requirements (for example, dates by which the training must be completed) in the recommendations offered.

To develop its recommendations, the training guidance system employs multiple modeling techniques POMDP (ATM subsystem) and machine learning (RAPID subsystem) that identify optimal training paths/solutions given training requirements based on the trainee's profile of current skills, desired training outcomes, and the available training environments, devices, and content. Should the optimal solution not exist, the training recommendations will suggest the capabilities that an environment or content must have in order to attain the desired outcomes.

The training guidance system, when using the RAPID and ATM subsystems, should be able to provide a training solution where the training content is associated with a training environment that has the best ability to convey that training content.

The disclosed solution is not an easily recognized solution. First, it assesses training more comprehensively in ways that have perhaps been considered, but have not been combined within one system that can infer relationships among data to produce training environment or event recommendations. The training guidance system accounts for a variety of factors (e.g., the logistical aspects of training, content, an individual's profile, training environment) that enable learning objectives to be achieved. Referring to FIG. 1, the variety of system factors that have been taken into account include training solutions and training requirements which comprise training configurations and training outcomes. Training configurations 120 may comprise (1) operational platform 121, (2) trainee role and experience 122 and (3) training type 123; and training outcomes 130 may comprise (4) training competencies 131, (5) training knowledge and skills 132 and (6) experiences 133. Training solutions 140 may comprise (7) training environments 141 and (8) training content 142. In some embodiments, training configurations 120 further comprise (9) trainee performance of experiences 124 to determine what experiences the trainee should train in next. Additionally, the components of the framework underlying the solution were combined in a way that other solutions have failed to consider. The problem of duplicated training and including a training device that fails to train critical objectives has already existed, but the disclosed solution is a systematic implementation of a solution that can adaptively select and recommend training environments and content that are tailored to the individual trainee. Furthermore, the ATM subsystem 170 may further comprise a state evaluator, which constantly monitors trainee state, includes training requirements such as the knowledge and skills and experiences for the job. With the ATM subsystem 170, the system continuously evaluates the differences between current state and required state in order to determine appropriate training solutions. Because the disclosed solution collects and organizes a variety of sources of data, current and future training effectiveness assessments and training recommendations can be made as training requirements and environments evolve. This is possible because of the comprehensive set of characteristics identified in the RAPID framework 110F that is used to describe the training requirements and environments as well as mathematical relationships that can be made and refined between training requirements and training solutions.

The RAPID Subsystem, (Training Environment Guidance Subsystem):

The RAPID subsystem is used to describe the components of the training guidance system that generally provide the analysis and guidance regarding the environment and characteristics of the training solution. The RAPID subsystem generally assesses training devices, methods, and environments and identifies the most effective training environment. The RAPID subsystem compares training requirements (configuration and outcomes) to a comprehensive set of characteristics used to describe training devices, methods, and environments and evaluates the training effectiveness of each. If the effectiveness is insufficient, the tool provides a blended training environment, which comprises a solution of training devices, methods, and additional recommendations for maximizing training effectiveness. RAPID objectively analyzes relationships between environmental characteristics and desired training outcomes.

Figure 2:
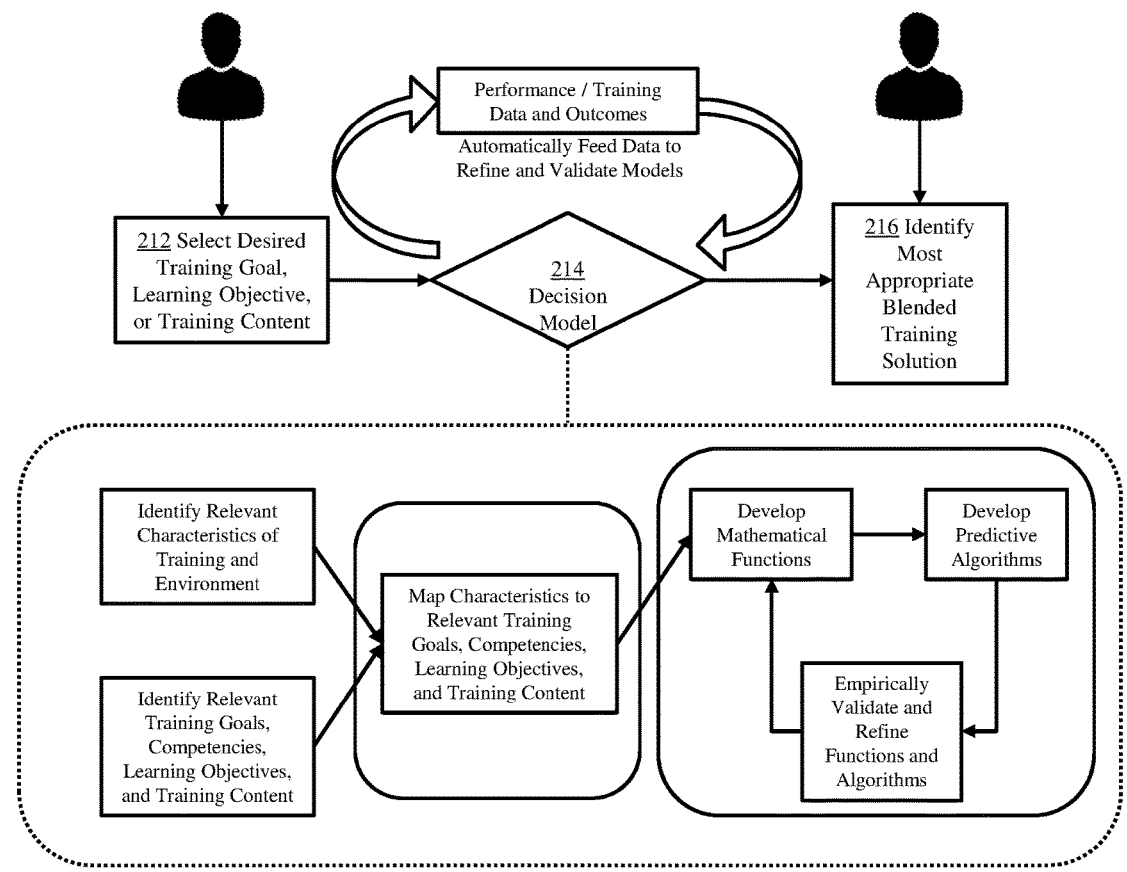
FIG. 2 illustrates a high-level functional overview of the RAPID subsystem.

FIG. 2 illustrates an overview of the general RAPID subsystem processes for developing the framework, gathering initial data 212, developing mathematical relationships 214, or functions, among the components in the framework, designing the decision model, and plans for using modeling techniques and initial data to provide a training environment recommendation 216. The RAPID subsystem may be an automated diagnostic decision support tool that enables the trainee or their instructors to specify who and what they are training and receive a recommendation on a training device, or perhaps an environment that consists of a device and a strategy (i.e., using simulator X but include role playing with a live person standing over the trainee's shoulder).

RAPID also contributes the underlying organizational framework used by both RAPID and ATM. See FIG. 1. The RAPID framework 110F consists of user configurable configuration components (e.g., role and experience, trainee experience performance, platform, training type and training environment). These components require user input to help define the parameters for the training configuration and evaluation session. In one embodiment, the user input is provided by selecting component values from a list or predetermined components. The framework also includes pre-defined outcome components (e.g., competencies, learning objectives, content, and characteristics). These are outcome components are pre-defined based on their relationship to the configuration components whereby the configuration components narrow the universe of outcome components that are specific to the selected configuration components. The relationships between the configuration and the pre-defined outcome components enable the RAPID subsystem to provide a customized list of training environments to choose from in the Content Selection Panel. The relationships and linkages between components make it possible for the RAPID subsystem to quickly generate a data-driven environment recommendation. The framework may be refined and expanded to include additional positions, platforms, missions, mission phases, and environments.

With respect to components, the framework defines training components and requirements such as, but not limited to: Platform (e.g., the operational platform in which the trainee performs his or her job); Role and Experience (e.g., the role of the trainee and whether the trainee is experienced or inexperienced within his or her role); Training Type (e.g., whether the training is initial qualification, mission qualification, upgrade, or currency); Competencies (e.g., a category of knowledge and skills essential for successfully completing a mission); Knowledge and skills (e.g., knowledge and skills that trainees must learn in order to be considered proficient in one or more competencies); Experiences (e.g., experiences or instructional content essential for proficiency in knowledge or a skill). The RAPID subsystem also defines training components such as the a set of Characteristics (e.g., features of a particular training environment or device that may support or abate effective learning) that are associated with a Training Environment (e.g., settings, methods, or situations that provide opportunity for trainees to encounter training/instructional content appropriately to achieve specified training goals). The outcome of the RAPID subsystem is a recommendation of the training environment based on the training requirements selected.

In some embodiments, the training characteristics include logistical characteristics such as technical support, frequency of maintenance, ability to upgrade software, concurrency with operational environment and more. In some embodiments, the training characteristics may also comprise psychological fidelity characteristics such as realistic battle rhythm, workload, stress, and more. In these embodiments, the logistical and psychological fidelity characteristics can be used as a component to determine the recommended training environment.

With this trainee profile framework, relevancy functions defining mathematical relationships can be established among the framework components based on a collection of multi-sourced data (such as data from literature reviews, expert judgments, card sorting methodologies, and objective performance data from previous empirical studies) in the RAPID effort. A critical relationship in the framework lies between the characteristics used to define the training content and environments and training experiences because the characteristics and their interactions have implications for training performance and transfer.

Relevancy functions, such as machine-learning techniques, are also able to automatically incorporate results of experiments to adjust and refine the mathematical relationships. The RAPID model is based on a computational framework for relating training system characteristics to training outcomes, a framework that quantifies the relationships through the use of mathematical functions. Often there are initially not enough experimental performance data to derive these functions, and as such, a hybrid approach is used by combining the available experiment data with theoretical research and subject matter expertise. As new experimental data become available, the model may incorporate this new information.

Advanced machine learning techniques may be applied to: a) infer unknown relationships based on those that are established and b) refine "established" relationships based on empirical performance data.

The underlying mathematical relevancy functions used to relate system characteristics to training outcomes may be polynomial functions of the form $$y = a_n x^n + a_{n-1} x^{n-1} + \ldots + a_2 x^2 + a_1 x + a_0$$

which have been found sufficient to capture most types of relationships. Traditionally, these functions would be derived through a straight-forward regression calculation of the experimental data. However, when experimental data are not available, we can still derive approximate functions based on theoretical research and subject matter expertise.

Figure 5:
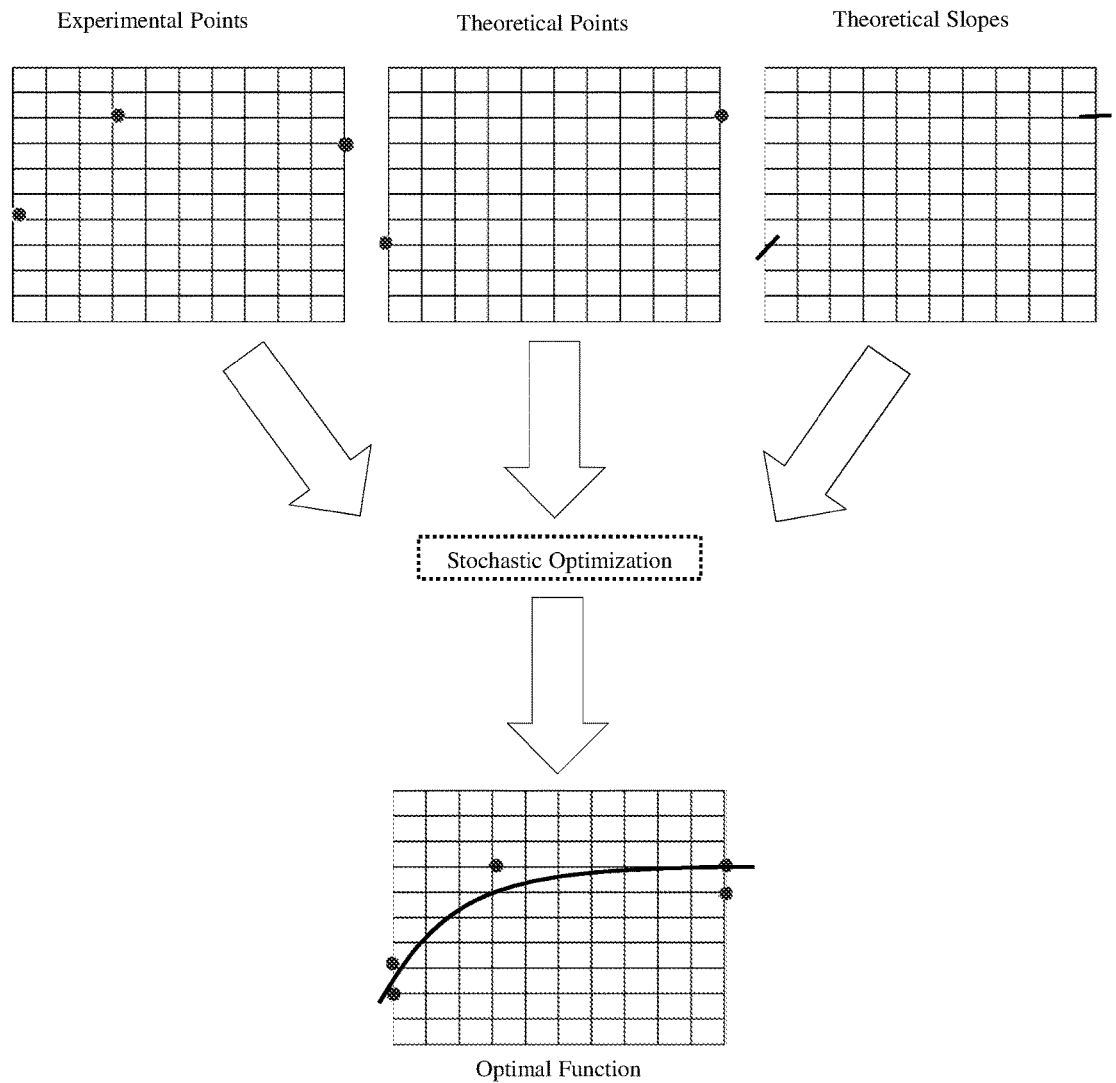
FIG. 5 illustrates the concept of finding a function that defines a relationship given a set of points (derived from theoretical and experimental data) as well as desired slopes of the function.

In some embodiments, as shown in FIG. 5, the relevancy function may comprise a best fit curve which is able to define a function based on several inputs.

Within this framework, the RAPID subsystem may also use machine learning algorithms, such as genetic algorithms, to update or build relationships among the data in the framework. For example, machine learning techniques are used to develop or refine the relationships between the training outcomes and the training environments. RAPID subsystem uses the results of these algorithms to determine a recommendation for the training device, method, or environment (i.e., a blended solution) best suited to achieve training requirements. Machine learning techniques may also be used to create relationships between new training requirements and environments where a pre-defined relationship has not been made.

These components are used to define the RAPID subsystem workflow. The workflow systematically guides the trainee towards specification of the most relevant training environment. More specifically, the RAPID subsystem user can select one option among several for each of the configuration components mentioned above. Doing so focuses the evaluation on the most relevant training requirements, which are the outcome components listed above (training goals, competencies, learning objectives, and training/instructional content). The training requirements are linked to particular characteristics of training devices and environments; the characteristics provide a way of describing a training environment with respect to its capabilities in addition to describing the extent to which these characteristics should be a part of training to address particular training requirements.

The training environment is mathematically selected from the multiple characteristics by a best fit optimization model (BFO) that will compute how well a training environment will match a training requirement. The BFO model builds relationships between each of the training competencies, knowledge and skills, experiences and training characteristics. The BFO model then compares the required training environment characteristics to those actually present in different training environments. For example, if a specific training competency requires that the training environment had a motion cues fidelity level of at least a 7 out of 10, and a training environment had a motion cues fidelity level of a 3 out of 10, this requirement would not be met, and the overall score for that training environment would reflect this shortcoming. One method of showing this score is:

$$score = \frac{number\ of\ requirements\ met}{number\ of\ requirements}$$

Some of these training requirements could also be weighted to show how much they are required to be present in the training environment as shown below:

score=0.5*display panel controls+0.3*motion cues+ 0.2*User Interfaces

In some embodiments, the training environment fidelity requirements may be binary or additive. For example, if the fidelity requirements for the three training environment characteristics above were 2, 5, and 7 for a specific training goal, and the training environment had fidelity levels of 3, 4, and 7, we would get the following scores:

Binary: 2/3=0.66 or 66%

Weighted Binary=0.5*1+0.3*0+0.2*1=0.7 or 70%

Additive=0.5*(3−2+1)+0.3*0+0.2*(7−7+1)=1.2

Each different scoring strategy comes up with a different score for the same problem, but when comparing training environments, these differences would help a user to understand the differences between environments, and where they may potentially fall short.

Once the model is built and all of these linkages are populated, the BFO model can be tested and refined in real time with new data. These data will rate the trainee performance on different training competencies, knowledge and skills and experiences and that information, along with the presumed fidelity level of their training environment will update the BFO model to better capture the true relationship between training requirements and training environments. If the true requirements are well known, the BFO model may update its definition of the level of fidelity that is present in each training environment. In some embodiments, the RAPID model user may decide which tuning parameter needs to be changed, the fidelity level, or the fidelity requirement.

In some embodiments, the relationships between the training requirements and the training characteristics may be defined by one or more mathematical functions and the BFO model may determine the optimal training characteristics that meet the training requirements. These embodiments may utilize the mathematical function examples and the feature to objective (as characteristic to requirement) relationship modeling methods described in pending U.S. patent application Ser. No. 12/244,798, filed on Oct. 3, 2008, entitled "SYSTEM AND METHOD FOR COMPARING SYSTEM FEATURES" which is herein incorporated by reference in its entirety. For example, individual relationships between one set of a training requirement and a training characteristic may be one polynomial and a second polynomial may define the relationship between a second requirement and characteristic set. The BFO may then combine the results of the individual functions, across different values of the function variables, to determine the optimal score representing the optimal mix of training characteristics to meet the training requirements. This combination may be done with m characteristics and n training requirements such that there will be in all m*n functions for the BFO to evaluate. In some embodiments with training relationships defined as functions, the functions may be predefined or they may be determined using the methods described in U.S. patent application Ser. No. 12/244,798.

Figure 3:
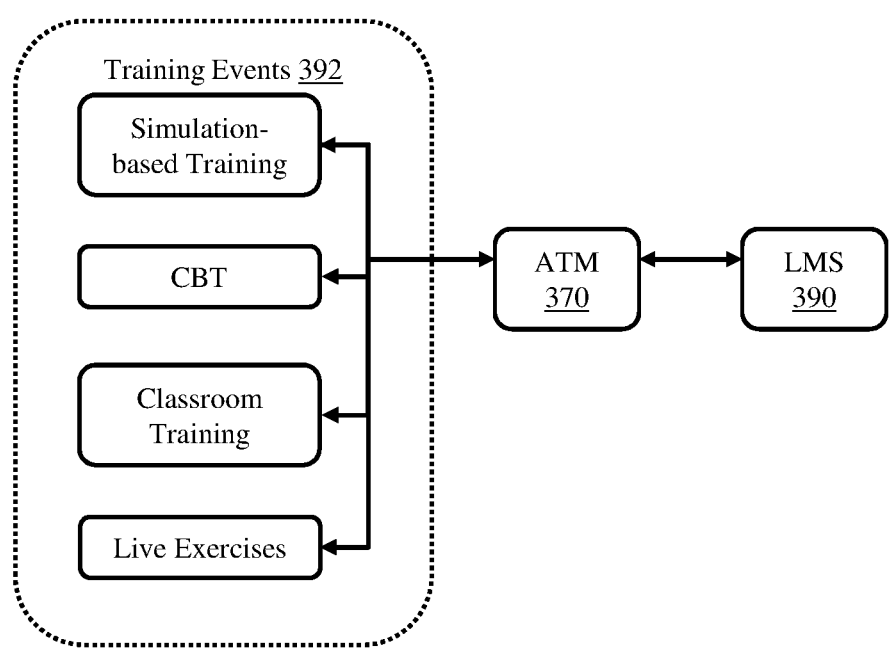
FIG. 3 illustrates a high-level functional overview of one embodiment of the ATM subsystem integrating learning events (content) with a Learning Management System (LMS)

The ATM Subsystem, (Trainee Content Guidance Subsystem):

The ATM subsystem integrates Learning Management Systems (LMS) technology, performance measurement methods and tools, and adaptive simulation based training methods and technologies in order to guide the selection of training environment, the selection of available course materials, the optimal scheduling of team training exercises. As shown in FIG. 3, the ATM subsystem 370 may be a simulator and LMS 390 agnostic plug-in module that will provide instructors, training managers, and supervisors with a capability to develop adaptive learning paths for trainees to efficiently navigate the variety of learning environments and modules/scenarios available to them through training events 392. The ATM subsystem 370 may be built on the RAPID framework and with other systems that link training objectives, performance measurement data, learning environment characteristics, and training content. The ATM subsystem 370 combines automated performance measurement tools and a relationship function, such as POMDP models, to appropriately characterize the learning state of the trainee and determine what training content should be experienced next. The POMDP compares an ideal profile of competencies to an individual's current profile, match shortfalls against available training opportunities, and recommend a set of optimal training content for the trainee. By using the POMDP modeling approach, the methods are mathematically optimal. That is, a precise model of the connections between curriculum elements is used to identify the most efficient path through the curriculum for a given trainee, at a given level of performance, at a particular time. In this way, POMDPs go beyond current manual branching and sequencing approaches traditionally used in an LMS. This approach supports the use of existing trainee performance data as well future trainee performance data collection (that is, as measurement systems for additional simulation-based training are implemented). Thus, as trainee performance data is collected over time, the model may be adjusted to ensure that it remains optimal (i.e., the model learns and adapts along with the learner and the mission).

Using the framework from the RAPID subsystem, ATM uses components to define a trainee profile and a state evaluator as input into a POMDP solution to provide training content recommendations and trainee state. The state evaluator considers the training requirements as well as the proficiency of the user in the knowledge and skills necessary to perform the job. The system continually compares the trainee's current state against a desired state and identifies instances in which current state is less than desired state. Using the POMDP model of the training curriculum, ATM guides the selection of training content based on components such as trainee performance data, known training objectives, relevant knowledge & skill elements, and available training content (e.g., CBT modules, LVC simulation scenarios, etc.). Examples of suitable POMDP models and application to training are disclosed in U.S. Pat. App. No. 61/780,167, filed on Mar. 13, 2013 and U.S. Pat. No. 8,655,822, issued on Feb. 18, 2014; both of which are herein incorporated by reference in their entirety.

Figure 4:
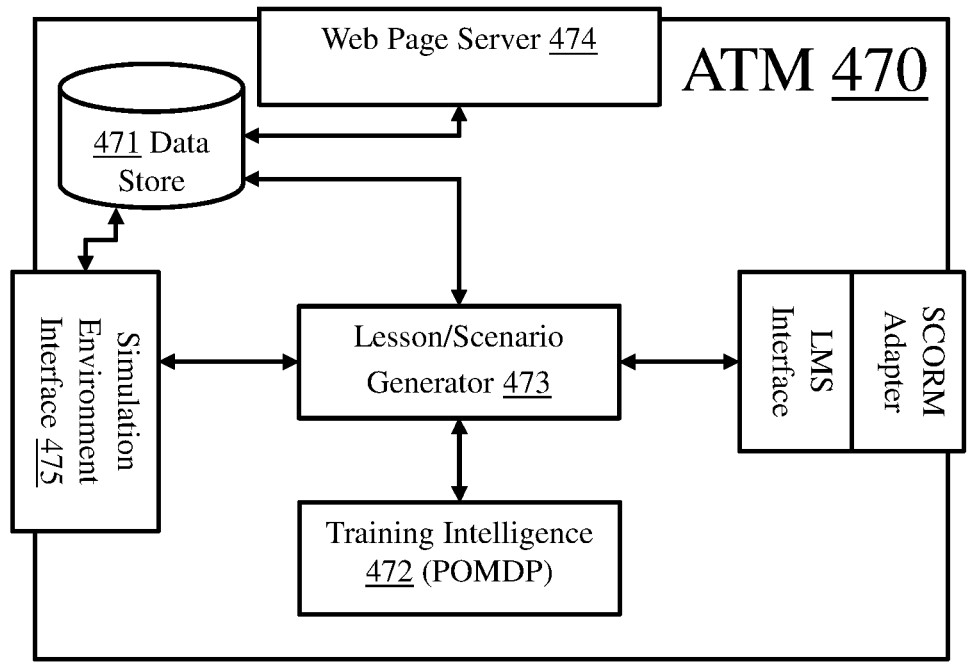
FIG. 4 illustrates a high-level functional overview of some components of one example embodiment of an ATM subsystem.

As shown in FIG. 4, the ATM subsystem 470 may comprise a training intelligence module 472 that implements the POMDP. The training intelligence module 472 models the training domain to formulate a decision theory problem of training content selection, and then to solve this problem thereby selecting training content. Inputs to the training intelligence module are categorized as (a) information about the training environment, (b) information about the trainee, and possibly (c) additional information entered by the instructor.

Information about the training environment may include data such as but not limited to: a set of possible trainee roles; Knowledge, Skills, and Tasks (KSTs) associated with each role; a set of experiences or other content necessary to completely acquire the KST; training course content; a set of experiences or other content available in the course; and records of trainee performance to date. Trainee roles identify the relevant KSTs which are then considered as potential training goals. The goal of the training intelligence module is to select the set of training course content that best addresses the KSTs as training content for the trainee. In order to link KSTs to the course content which best trains it, the KSTs include a set of experiences. Course content contains experiences, and KSTs require experiences, therefore the training intelligence module reasons that the experiences within the course content correspond to the experiences required to obtain proficiency in KSTs. Training on those experiences is done by selecting course content which contains those experiences.

Information about the trainee may include records of trainee performance are used to identify which KSTs in which the trainee is proficient, and which need training or remediation. This information is gathered to try to determine a state of the trainee. Information about trainees may include the platforms used by the trainee, the role(s) of the individual trainee, experiences of the trainee such as course content to which the trainee has previously been exposed, and performance of the trainee in the experiences such as the course content.

Additional information may also be entered by an instructor or trainee to prioritize certain KSTs for the trainee. This additional information may include optional information such as but not limited to: Weighting of each KST (on a scale of 1 to 10, how important is the KST?); the selected KST to be trained next; the desired skill level for the KST (novice, intermediate, expert, etc.); and mode of training for the trainee (sum or minimal); and performance information (scores) as it is received. Each KST is associated with a weight which may allow the instructor to prioritize some KSTs over others for training. That is, assuming higher numbers specify higher priority, the intelligent training module will prefer course content associated with KSTs of priority 10 over course content associated with KSTs of priority 0. The instructor may also the option of directly specifying which KST(s) should be trained next whereby the system will then only look for course content directly associated with the specified KST(s). The role specified by the training environment may also specify a default desired skill level for the KST. That is, each role will be associated with an expertise (e.g., "intermediate") required for the role. However, the instructor has the option of overriding this desired skill level. That is, making the training goals easier or more difficult. The mode of training is also an optional parameter, the default is sum mode. ATM assesses each trainee's proficiency level on a scale of 1 to 100 on each KST. Sum mode simply adds all the skill levels across KSTs (optionally weighting each by the desired weighting). Minimal mode, by contrast assesses the trainee's worst skill. For example, suppose a role has three KSTs associated with, all weighted equally. Training Content A is likely to bring the trainee to proficiency level <80,90,100> and Training Content B is likely to bring the trainee to a proficiency level of <88,88,88>. The sum mode prefers Course Content A, as:

$$80+90+100>88+88+88$$

Minimal mode says that a trainee is only as good as the worst skill, so prefers Training Content B, because the lowest score is 88. The instructor may also enter performance information on course content as it is received. This may consist of a single score for the course content, or optionally, a score for each experience within the course if it is available.

Typically, there are two outputs from the training intelligence module, prescriptive and descriptive. The prescriptive content is the primary focus; the training module suggests course content to the instructor. The descriptive content provides information about how to make the decision such as assessed skill level, for the trainee, on each of the relevant KSTs. The prescriptive output is simply the suggested course content for training.

In one example embodiment, the training intelligence module will use a POMDP to guide instruction. POMDP solutions are able to adjust their assessment of the trainee, and select the next component of the curriculum based on the trainee results as they are obtained. Additionally, rather than just selecting the next module, a POMDP solution is a plan, which includes a plan for future steps of the curriculum as well as the current one. This approach to mathematically modeling the trainee is to combine multiple sources of observable information and hypotheses about non-observable information to form an optimized plan called the POMDP policy that transitions the trainee through a sequence of scenes in a scenario. Thus, for any given trainee for which we have collected data, the mathematical modeling approach can determine training training content and training modules. For example, for a trainee that fails every training item, the branches will invoke easier and easier training event. Similarly for a trainee that performs well on every quiz, the training content chosen will be harder and harder. For the trainee that performs well in some skills but poorly in others, training content will be selected to exercise those skills.

In an example embodiment, a POMDP can be defined with the tuple: M=(S, A, P, Ω, O, R, γ) such that:

S is a set of states (experience performance (proficiency level) on each experience of a KST)

A is a set of actions (training content with associated experiences)

P is the state transition probability table: P (s'|s, a),

Ω is the set of observations (performance)

O is the observation probability function: O(o|s',a,s'),

R is the reward function: R(s, a), the immediate reward for being in state s and taking action a.

γ∈(0,1) is a discount factor between 0 and 1.

The state space in the analysis will be determined from the training requirements (e.g., platforms, roles and experiences, training type, performance, competencies, KSTs and experiences) organized by the trainee role. For each construct, or competency numbered i we create a set $S_i$ consisting of the number of possible levels for the competency (e.g., 1="novice", 3="intermediate", 5="expert"), then we create the state space $S=S_1 \times \ldots \times S_n$ where each $S_i$ represents a number of possible trainee levels on competency. A POMDP solver tracks the distribution of possible states that the trainee may be in. This is formally referred to as a belief state, b∈P(S).

The set of actions is the available training content or modules accessible to the instructor. Each training content will be tagged for its difficulty level in each of the competencies. This will be used to help define the state transition probability table P. For example, difficult learning modules will have a positive effect on advanced trainees, whereas novice learning modules will have a positive effect on novice trainees. The state transition module (defined as Transition Model in FIG. 6A) will be determined a priori and adjusted by learning the transition probabilities as training data becomes available.

Figure 6A:
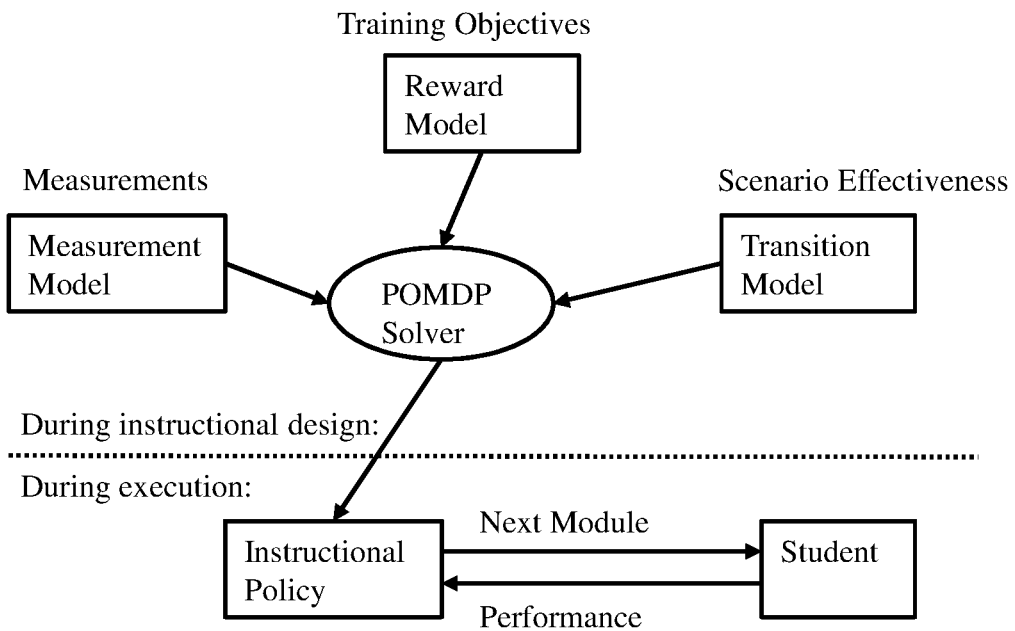
FIG. 6A illustrates an overview of the framework of a Partially Observable Markov Decision Process (POMDP)

After each module/scenario, an assessment will be made as to trainee performance, defining the observation probability function (defined as Measurement Model in FIG. 6A). The probability function will specify the accuracy of assessment. Define the set of possible observations as Ω. For example, at the level of a quiz the set Ω is the set of possible quiz scores. As a second example, at the level of a question the set Ω may be correct or incorrect. Define the observation function as a probability function (o∈O|s∈S, a∈A, s'∈S), specifying the chance of a given outcome the previous a trainee state and learning item. Through use of this probability table, trainee state can be inferred.

The purpose of the instructional model is to select actions, or training content, at each step which maximizes trainee capabilities. This will be enforced through the reward function (labeled Reward Model in FIG. 6A). Note that this function rewards the instructional model for obtaining the training objectives, and not the trainee. The instructional model will receive higher reward for moving trainees into states of high competency.

Finally, γ is a discount function on the reward. With each successive step, reward is multiplied by γ forcing the model to converge. Typical values for γ are 0.95 or 0.99.

Figure 6B:
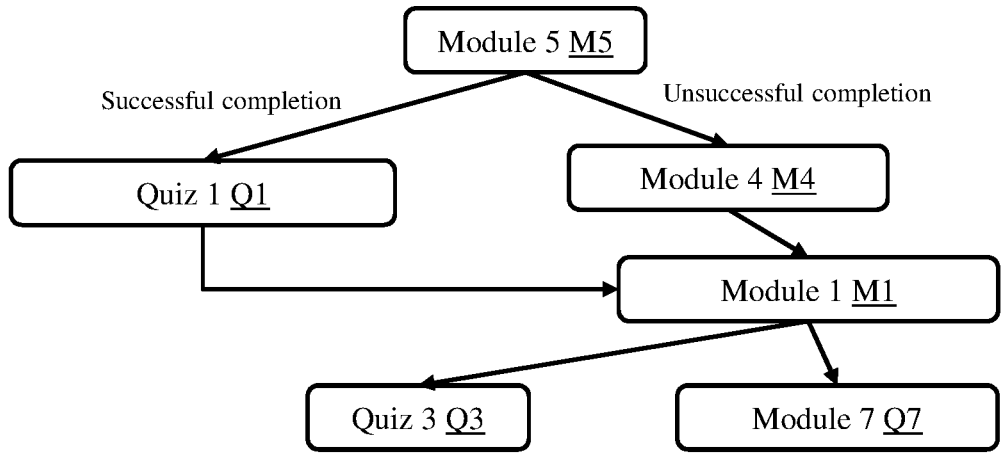
FIG. 6B illustrates a simple example of a POMDP.

The goal of the POMDP planner is to provide a plan for instruction. This is a mapping from each possible history of trainee measurements to the next content of a curriculum. A simple example of a POMDP policy is shown in FIG. 6B. This example policy starts at the top of the tree and proceeds downwards. Each arrow represents a possible observation. The trainee is presented with Learning Module 5 M5. If the trainee completes it successfully, Quiz 1 Q1 is given. If not, Module 4 M4 is invoked. The policy continues similarly with Module 1 M1, Quiz 3 Q3 and Module 7 M7. As opposed to this simple hand-drawn policy, automatically generated policies w may have hundreds of branches (observations) for each node.

A POMDP solver tries to maximize the total reward:

$$E\left(\sum_{t=0}^{T} r_t\right)$$

Given a Markov decision process (MDP) (ignoring the partial observability aspect for the moment), the object is to construct a stationary policy π: S→A, where π(s) denotes the action to be executed in state s, that maximizes the expected accumulated reward over a horizon T of interest:

$$E\left(\sum_{t=0}^{T} r_t\right),$$

where $r_t$ is a reward at time t.

If the horizon is infinite (T=∞), it can be shown that the value of the policy is:

$$V_\pi(s) = \sum_{t \in S} R(s, \pi(s), t) + V_\pi(t) \cdot P(s, \pi(s), t).$$

Optimal policy value function is found as $$V*(s) = \max_a \left[\sum_{t \in S} R(s, a, t) + V*(t) \cdot P(s, a, t)\right].$$

Corresponding optimal policy is:

$$\pi*(s) = \operatorname*{argmax}_a \left[\sum_{t \in S} R(s, a, t) + V*(t) \cdot P(s, a, t)\right].$$

More simply put, a policy denotes what action the trainee should take (i.e., what content should be taken), given a trainee state or an instructor belief about trainee state. This instructor belief about trainee state is being updated with each measurement of performance.

The POMDP performs a similar operation by using the Bellman equation. It constructs a value function V for a policy which is a set of α-vectors, each of which is |S|-dimensional and whose components hold the value of the policy for that state. For each state, the subpolicy is chosen according to which α-vector holds the highest value for that state. The initial set of α-vectors is simply one vector for each action. At each step, the n-step policies are used to construct (n+1)-step policies through use of the Bellman equation below. V' represents the current set of α-vectors for the n-step policies.

$$V_\pi(b) = \max_a \left( \sum_s R(s, a)b(s) + \gamma \sum_o \max_{\alpha' \in V'} \sum_s \sum_{s'} P(s, a, s')\Omega(o, s', a)\alpha'(s')b(s) \right)$$

That is, the value of a belief state is the value of the best (instructional) action that can be taken from that belief state, which in turn is the immediate reward for taking that action plus the expected reward based on the next observation that can be received, and assuming that the best sub-policy is taken after receiving that observation.

The resulting POMDP model serves as the basis for the training intelligence module of the ATM system.

The training intelligence module of the ATM subsystem involves formatting the input (specified above) into a POMDP problem, and interpreting the solution of the POMDP problem in order to provide training recommendations and trainee status. In general, the training intelligence module operates by performing the following two operations in a loop. First, it recommends the best training content for the trainee, given its current assessment of trainee experience. Then, it updates its assessment of the trainee state, based on results. If needed, after the second step, the two steps are repeated.

Figure 7:
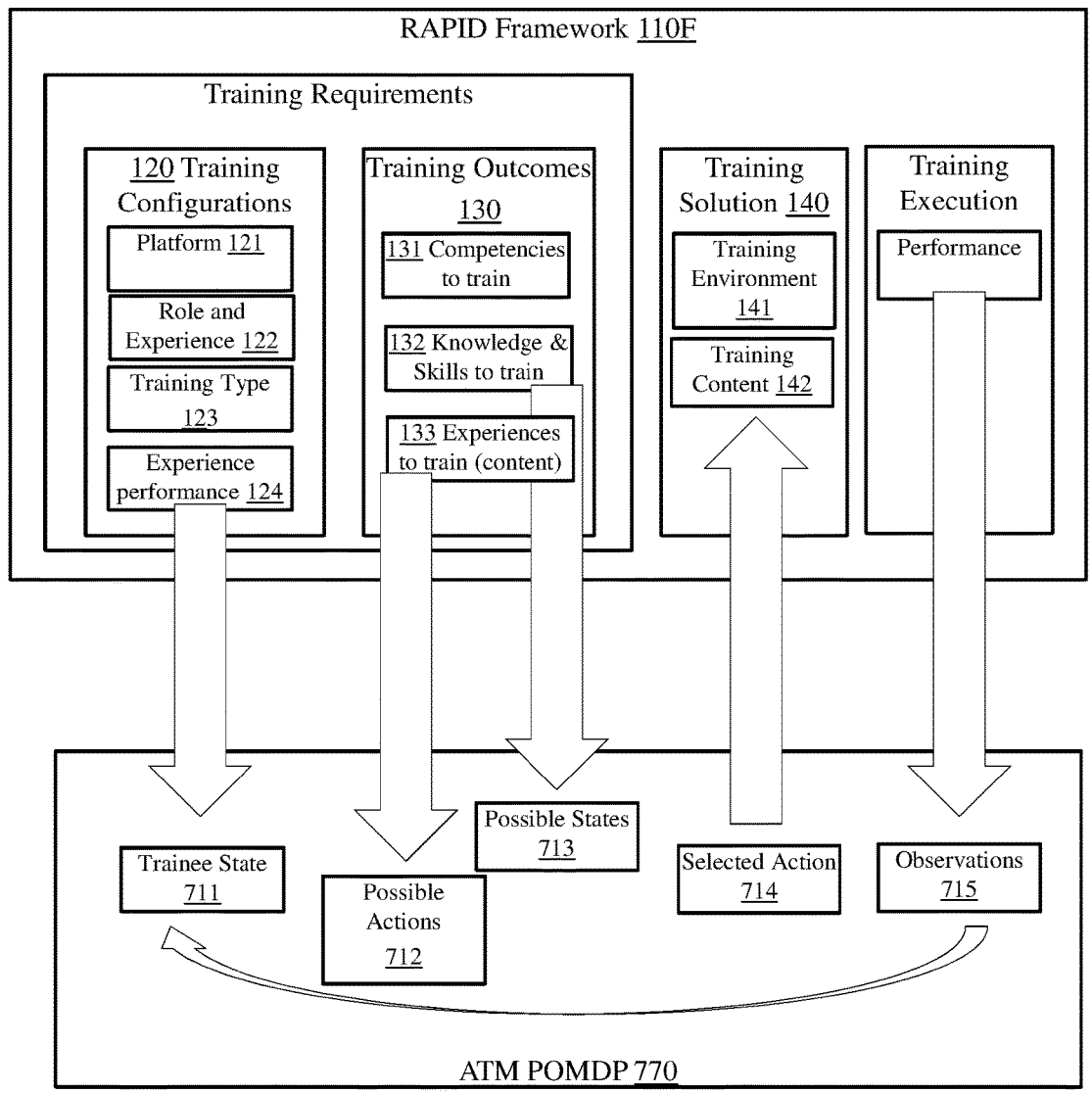
FIG. 7 illustrates a process diagram illustrating the general concepts of one example embodiment of the invention showing the relationship of RAPID subsystem functions and ATM subsystem functions.

Before the POMDP can begin, however, it must be made aware of the possible states of the trainee, the content it has to select from, etc. Referring to FIG. 7, formatting input into POMDP language involves casting the inputs from the RAPID framework 710F into the POMDP 770 model. This involves constructing the states 713, actions 712, transitions, observations 715, etc. for the POMDP which are generated as described below.

The POMDP 770 must track all possible trainee states 713. The POMDP 770 tracks state as a proficiency level on each experience. Thus, the POMDP requires a list of possible experiences for which the trainee should gain expertise. Given the RAPID framework 110F (and selected components as also described above in FIG. 1), the POMDP 770 is able to use the KSTs 132 that have been determined to be associated with each role 131 (competencies to train). Within each KST, the set of experiences 133 relevant to that KST is also defined. With this framework, the training intelligence module knows about a large set of experiences 133, each of which maps to one or more KSTs 132 and one or more roles 131 to define the possible trainee states 713.

As an illustrative example, suppose the role is a Bank Branch Manager. The set of KSTs is then derived, one of which is to Organize and Direct Operations (we will call this Org), and another is to coordinate the market intelligence process (we will call this Intel). Org is now decomposed into a set of experiences including Finance, Leadership, and Work—arounds & backups. Intel is similarly decomposed into a set of experiences including Finance, Time Management Experience, and Auditing. Note that Finance appears on both lists. The set of experiences is then:

Set: Finance, Leadership, Workarounds, Time Management, and Auditing.

The state space is then all the possible levels of expertise that the trainee can obtain on these various experiences. That is, trainee states are the set including {Finance = novice, Leadership = novice, Workaround = novice, Time Management = novice, Auditing = novice]

{Finance = intermediate, Leadership = novice, Workaround = novice,

Time Management = novice, Auditing = novice]

{Finance = novice, Leadership = intermediate, Workaround = novice,

Time Management = novice, Auditing = novice]

{Finance = intermediate, Leadership = intermediate,

Workaround = intermediate,

Time Management = intermediate, Auditing = intermediate]

{Financing = advanced, Leadership = advanced, Workaround = advanced,

Time Management = advanced, Auditing = advanced]

In reality, instead of the qualitative terms "novice, intermediate, expert", the POMDP state space uses a discrete scale of 1 to 5, i.e.

{Finance=1, Leadership=3, Workaround=5, Time Management=2, Auditing=4}

In the above example, there are $5^5$ possible states of the trainee.

The formal state space is defined as: vector $v \in V$ where length V is a vector of length |E|, and in turn E is the set of experiences, |E| is the number of experiences and $v_i \in \{1,2,3,4,5\}$.

The set of actions available to the instructor are simply one action for each possible training content. Thus, an example set of actions is:

Auditing course
Foundations of Management
Foundations of Finance
Etc.

Referring to FIG. 7, like each of the KSTs 744, each of the actions 712 is associated with the set of experiences 746 which it trains. Thus, for example:

Auditing course trains auditing, "through Corporate staff experience", etc.
Foundations of Management trains Finance, Economics, etc.

Also, optionally, each action may specify which level of trainee (novice, intermediate, expert) it is best suited to train.

The formal action space is: a set A, where each $a \in A$ is a training event.

The transitions map each state and action pair to a new state. In other words, there is a probability matrix, called the transition matrix, which specifies the probability that the trainee will improve on each skill, given the training content. For example, a trainee that is a novice in Finance may advance upon taking the Foundations of Management course.

Rewards reflect training outcomes and may be specified by the user at the KST level, not the experience level. Each trainee state describes the trainee level on a set of experiences, as described above. For example, the trainee state may say that the trainee is a novice at Finance, and intermediate at leadership, and advanced at workarounds. However, none of these are KSTs, they are simple experiences which jointly form a KST, in this case, the KST of Organize and Direct Operations. Thus, the model rewards the selection of actions which will best advance the KSTs.

Regarding observations, true trainee state is hidden to the instructor. That is, the instructor does not know the true state s of the trainee. The best one can do is infer the trainee state from test result, training content, etc. Thus, the set of observations are the set of possible test scores and assessments associated with each course. Observations are used to update instructor belief about trainee state, as they are received.

Formally, the instructor maintains a belief state b(s). Each trainee state is assigned a probability, that is, we may have:

{Finance=advanced,Leadership=intermediate,Time Management=novice]=50%

{Finance=intermediate,Leadership=advanced,Time Management=novice]=25%

{Finance=intermediate,Leadership=intermediate,Time Management=novice]=25%

The above says that the instructor believes that there is a 50% chance that the trainee is advanced at Finance, intermediate at Leadership, and a novice at Time Management. There is a 25% chance that the trainee is actually advanced at Leadership and not Finance. This belief can result from high performance on training events that involve primarily Finance, with a few tasks requiring Leadership as well. All three beliefs have the trainee as a novice at Time Management, so the ATM system would recommend training content that train Time Management in this case.

At each time step, the POMDP assesses each of its actions with a reward. The recommended training content is the action associated with the highest reward. However, it is often the case that there will be several actions with high reward. In this situation, the POMDP may display several possible actions, allowing the instructor to select the one that seems best. The training intelligence module also displays a summary of its assessment of trainee state. For each KST, the relevant set of experiences is found. Each of these experiences has a belief distribution associated with it. The training intelligence module aggregates this set of experiences, as well as the belief distribution of the experiences, into a single score for the KST which is displayed.

It is understood that in some cases, the training environment or certain training characteristics are not a variable and the ATM subsystem may select the best training content given the environment or characteristic.

In other cases, there may be some leeway with respect to training environment and characteristic and in those cases, the ATM subsystem would recommend the next best training content without being constrained by a particular training environment. These later cases are an example of where the ATM subsystem, working with the RAPID subsystem, are able to provide the training solution comprising both a training content and training environment.

Figure 8:
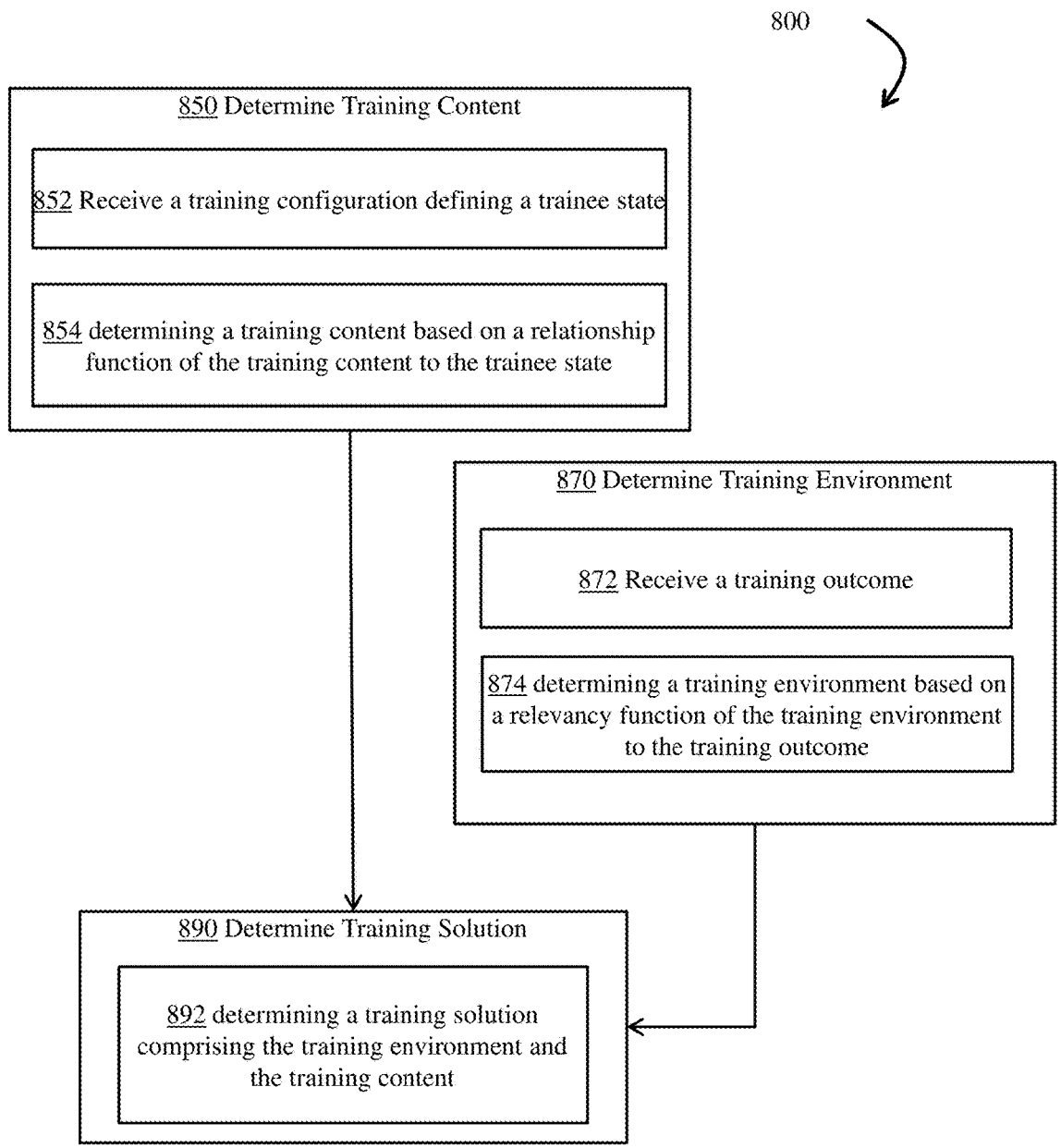
FIG. 8 illustrates a process diagram of one example embodiment of the disclosed methods.

One Embodiment of Methods to Provide Training Guidance:

For illustration purposes and not for limitation, one example embodiment of methods to provide training guidance is shown in FIG. 8. FIG. 8 illustrates a computer based method 800 to determine a training solution for a trainee, the method comprising generally determining a training content at 850, determining a training environment at 870 and determining a training solution comprising the training environment and the training content at 890. In more detail, the method 800 comprises receiving a training requirement comprising a training outcome at 852 and a training configuration at 872, the training configuration defining a trainee state, determining a training environment based on a relevancy function of the training environment to the training outcome at 874, determining a training content based on a relationship function of the training content to the trainee state at 854 and determining a training solution comprising the training environment and the training content at 892.

In some embodiments, the training outcome is selected from a plurality of predetermined training outcomes, the relevancy function defining a relevancy value for each of the predetermined training outcomes to each of a plurality of the training environments and determining the training environment based on a relevancy function of the training environment to the training outcome comprises selecting the training environment having the highest relevancy value to the training outcome. For example, the training requirement may comprise training requirements such as a platform, a role and experience, a training type and an experience and the training outcome may comprises predetermined training requirements consisting of a competency, a knowledge and skill and a training content and the training guidance methods the step of selecting the training outcome from a plurality of predetermined training outcomes comprises. Using this illustrative example, if each of the training requirements have a relevancy function defining a relationship to each of the training outcomes, such as a best fit curve, the relevancy functions can be combined and mathematical relationship can determine the best training environment given the training requirements. For example, the relevancy function defines a relevancy value of the requirement of role to competency and this value is combined with the relevancy values across all relationships to define a combined relevancy value. All combinations of relationships can be varied to determine the combination that provides the best fit between the training requirements and the training environments.

In some embodiments, the training configuration is selected from a plurality of predetermined training configurations, the relationship function defining a relationship value for each of the predetermined training configurations to each of a plurality of the training contents and determining the training content based on a relationship function of the training content to the training configurations comprises selecting the training content having the highest relationship value to the training configuration. For example, the highest relationship value to the training configuration is defined by the relationship function which may be a POMDP model.

In some embodiments, the methods may further include receiving a performance value of the training executing the training solution and then updating the relevancy function or the relationship function using the performance value and techniques such a machine learning technique.

Figure 9:
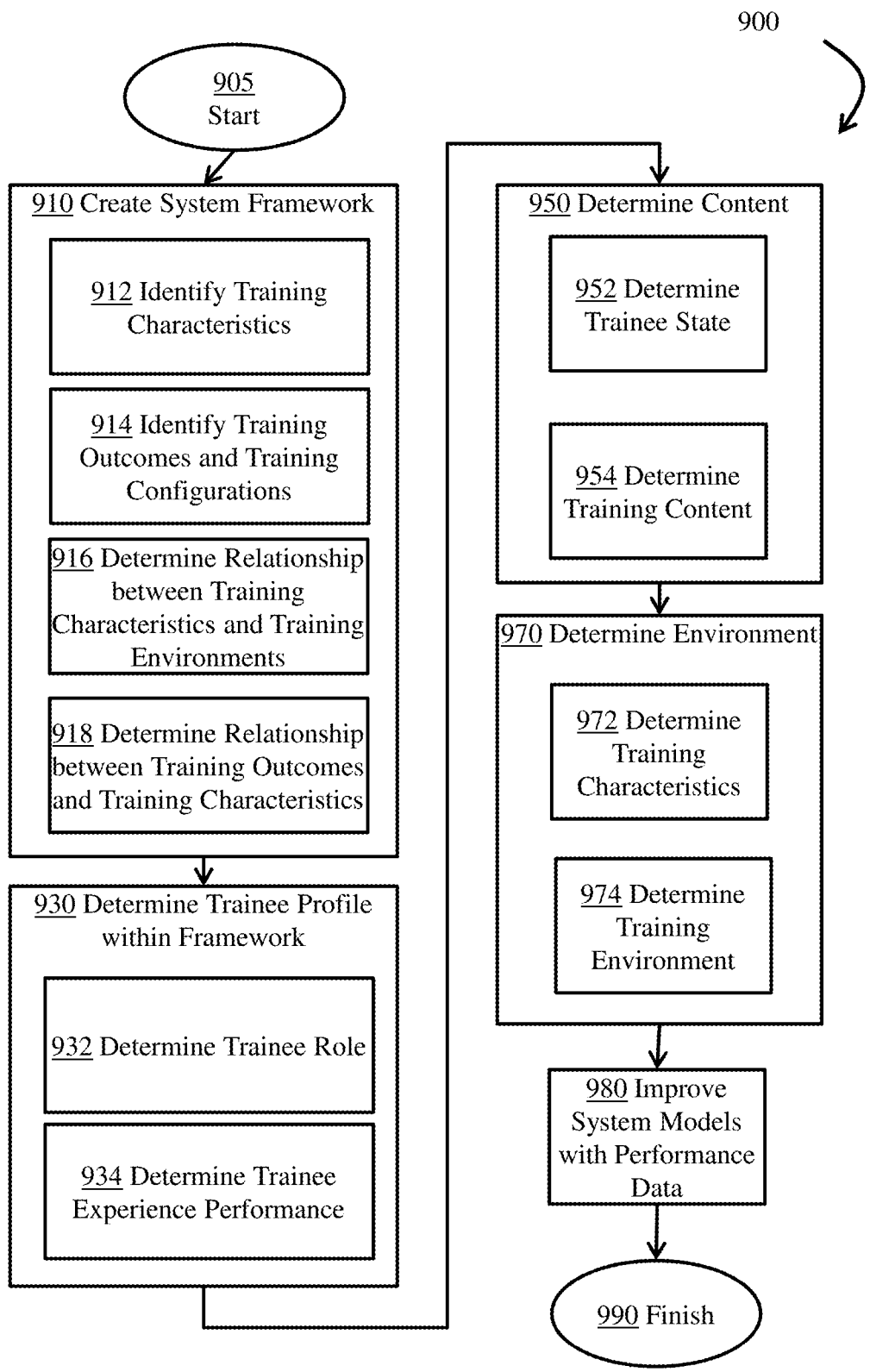
FIG. 9 illustrates a process diagram of one example embodiment of the disclosed methods.

FIG. 9 illustrates another embodiment of the methods to provide training guidance. In this embodiment, the first step involves creating a system framework at 910 which may comprise identifying training characteristics and training environments at 912 and identifying training outcomes and training configurations at 914. At 916, relationships are determined between the training characteristics and the training environments. At 918, relationships are determined between the training outcomes and the training characteristics. In some embodiments, the training configurations are mapped or related to the training outcomes. Using the system framework of 910, the framework is used to determine a trainee's profile at 930. The trainee profile may comprise determining the trainee's role at 932, determining the trainee's experience performance at 934. Within the framework, and with the trainee profile determined, the training content is determined at 950 and a training environment is determined at 970. At 950, a state evaluator may be used to determine the trainee's state at 952 and this may be used to determine the training content at 954. A training environment may be determined at 970 comprising determining training characteristics related to the training outcome at 972 and determining the training environment related to the training characteristics at 974. In some embodiments, as shown at 980, the models used in the system framework may be refined by taking performance data from execution of the system methods and using it to populate new value for components such as training characteristics or training requirements. In some embodiments, the system may also identify differences between trainees' current and desired end state in which the current state is less than desired end state. Areas in which the current state is deficient compared to the desired state will be identified to provide training content recommendations.

One Embodiment of the Learning Path System:

As will be readily apparent to those skilled in the art, learning path systems and methods can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 10:
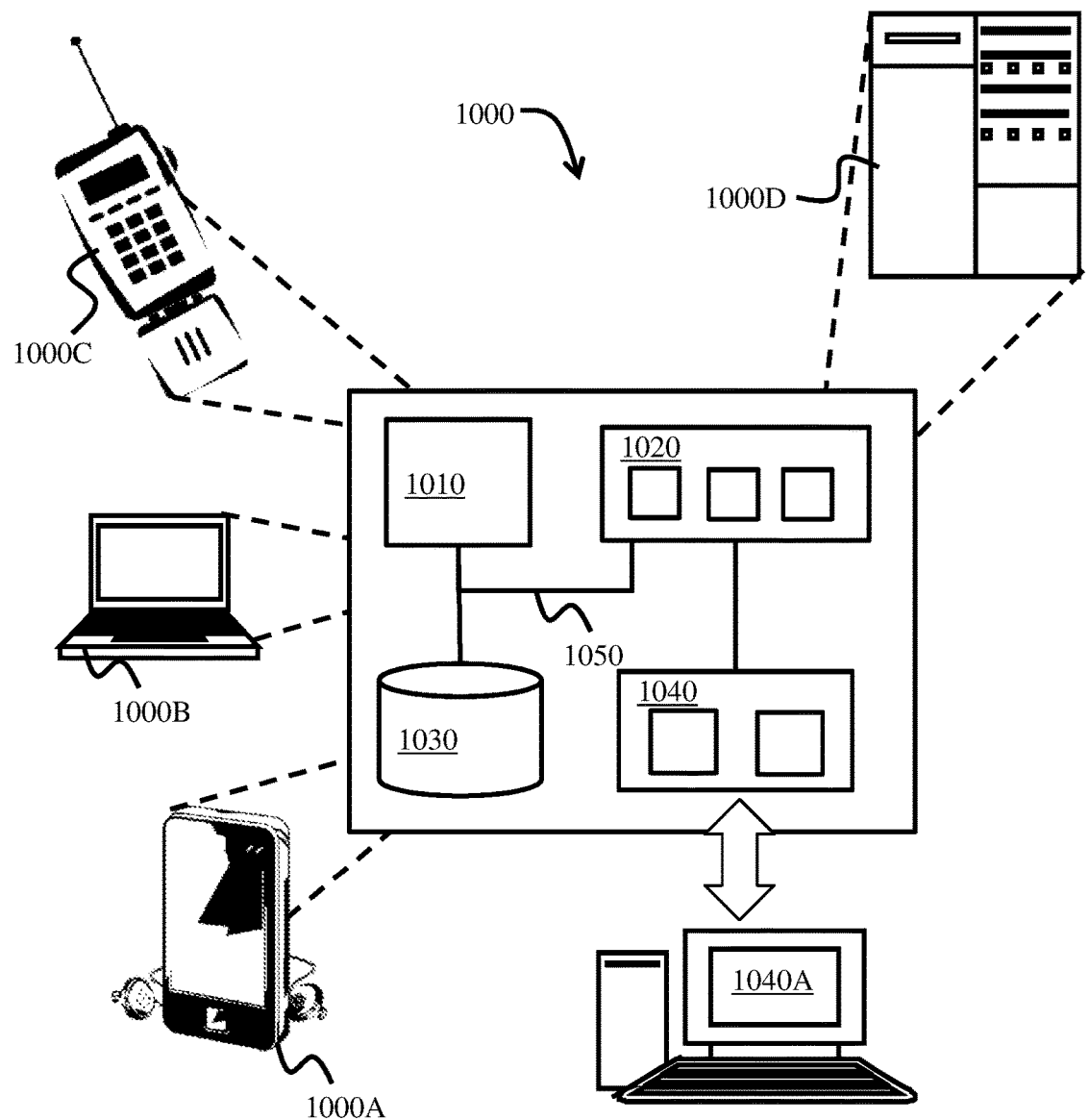
FIG. 10 illustrates one example embodiment of a computer system suitable for a system to provide training guidance.

FIG. 10 is a schematic diagram of one embodiment of a computer system 1000 by which the environmental system reaction methods may be carried out. The computer system 1000 can be used for the operations described in association with any of the computer implemented methods described herein. The computer system 1000 includes at least one processor 1010, a memory 1020 and an input/output device 1040. Each of the components 1010, 1020, and 1040 are operably coupled or interconnected using a system bus 1050. The computer system 1000 may further comprise a storage device 1030 operably coupled or interconnected with the system bus 1050.

The processor 1010 is capable of receiving the instructions and/or data and processing the instructions of a computer program for execution within the computer system 1000. In some embodiments, the processor 1010 is a single-threaded processor. In some embodiments, the processor 1010 is a multi-threaded processor. The processor 1010 is capable of processing instructions of a computer stored in the memory 1020 or on the storage device 1030 to communicate information to the input/output device 1040. Suitable processors for the execution of the computer program instruction include, by way of example, both general and special purpose microprocessors, and a sole processor or one of multiple processors of any kind of computer.

The memory 1020 stores information within the computer system 1000. Memory 1020 may comprise a magnetic disk such as an internal hard disk or removable disk; a magneto-optical disk; an optical disk; or a semiconductor memory device such as PROM, EPROM, EEPROM or a flash memory device. In some embodiments, the memory 1020 comprises a transitory or non-transitory computer readable medium. In some embodiments, the memory 1020 is a volatile memory unit. In another embodiment, the memory 1020 is a non-volatile memory unit.

The processor 1010 and the memory 1020 can be supplemented by, or incorporated in, ASICs (application-specific integrated circuits).

The storage device 1030 may be capable of providing mass storage for the system 1000. In various embodiments, the storage device 1030 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 1030 comprises a transitory or non-transitory computer readable medium.

In some embodiments, the memory 1020 and/or the storage device 1030 may be located on a remote system such as a server system, coupled to the processor 1010 via a network interface, such as an Ethernet interface.

The input/output device 1040 provides input/output operations for the system 1000 and may be in communication with a user interface 1040A as shown. In one embodiment, the input/output device 1040 includes a keyboard and/or pointing device. In some embodiments, the input/output device 1040 includes a display unit for displaying graphical user interfaces or the input/output device 1040 may comprise a touchscreen. In some embodiments, the user interface 1040A comprises devices such as, but not limited to a keyboard, pointing device, display device or a touchscreen that provides a user with the ability to communicate with the input/output device 1040.

The computer system 1000 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet. The computer system may be implemented in various other embodiments; for example and not for limitation, the computer system may be implemented as a Personal Digital Assistant or tablet computer 1000A, a computer 1000B, a phone 1000C or a server 1000D.

One example embodiment of the systems and methods to provide training guidance may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

Figure 11:
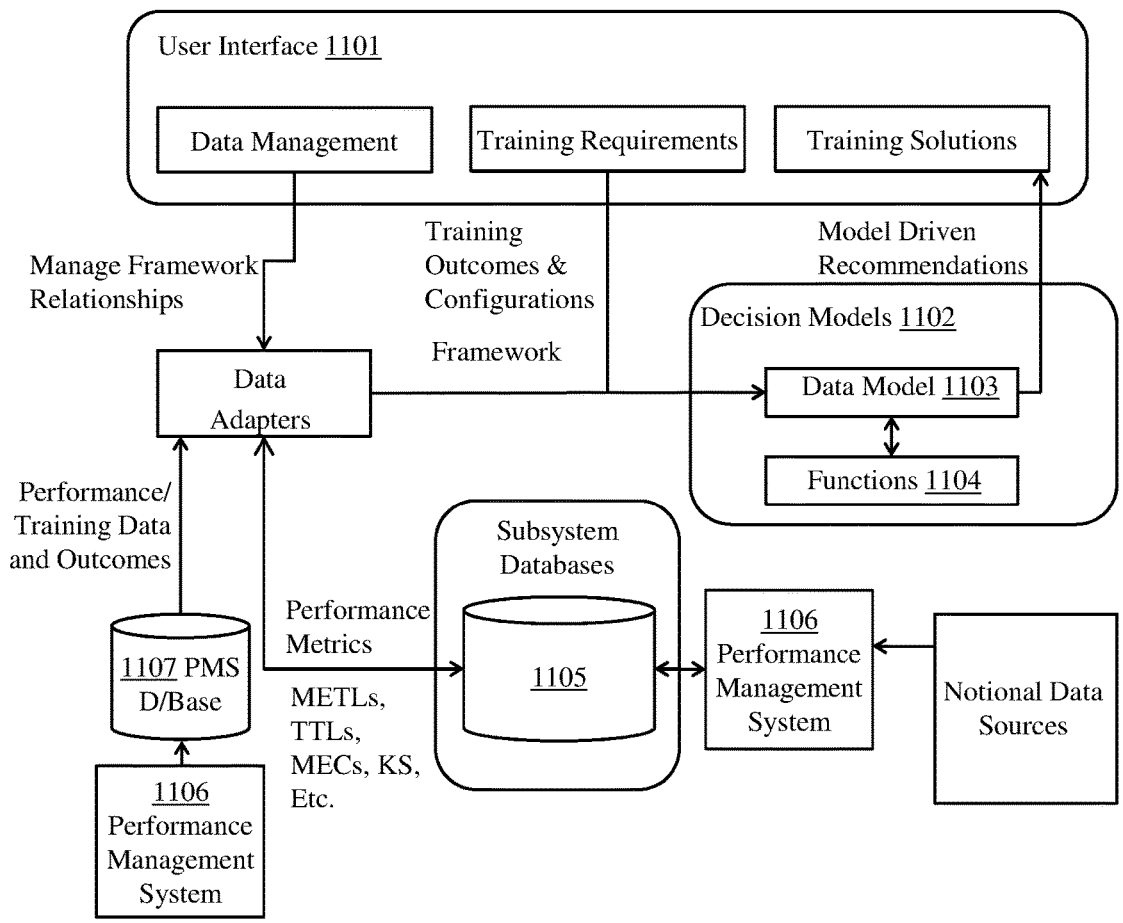
FIG. 11 illustrates a functional overview of one embodiment of ATM subsystem components.

FIG. 11 illustrates an example architecture for the RAPID subsystem and shows how RAPID (including the database, the recommendations that are produced by the decision model) can be integrated with performance measurement technologies. FIG. 11 illustrates a RAPID subsystem architecture with arrows representing information flows among subsystem components. The architecture may comprise the following components: (1) a user interface 1101 that accepts configuration inputs and displays the training solutions that the model produces, (2) the relevancy functions which may include data models 1103 and decision models 1102 which may include relevancy functions 1104, (3) a database 1105 that stores model relationships and other relevant data for the system, and (4) performance measurement system 1106 and databases 1107 to collect multimodal data to help validate and refine the decision models 1102. RAPID may use multimodal data (e.g., biometric, performance, observer-based) collection and storage to validate and refine the decision model 1102 relationships. The user interface 1101 of the RAPID subsystem may communicate with the databases and the RAPID decision models 1102. It may load the base set of model relationships and framework data from the performance management system (PMS) database 1103 and may then query the model with the RAPID user's training requirement selections. This may be a modular design allowing for flexibility so the components can be easily be modified or replaced. During training, the RAPID relevancy functions may be updated and refined in real-time, and once the training is complete, the database may collect the data from the various measurement systems that produce the results and bring it together in the database.

Within FIG. 11, the RAPID subsystem components may be further integrated with ATM subsystem components. For example, the decision module may further include or interface with ATM subsystem components to execute the ATM subsystem functions such as relationship functions. As shown in close detail in FIG. 4, the ATM subsystem 470 components may store detailed information about learning objectives and their mappings to specific pieces of training content along with the history of each student, their record of completed training, and their performance during that training. The ATM subsystem 470 may also store an estimated state of each student, which is generated and maintained by the training intelligence module 472 of FIG. 4. The training intelligence module 472 will take the last estimated student state, metadata describing any training that the student has undergone since the last student state estimation, and performance measurement results indicating how the student performed on that training. This information will be used by the POMDP to produce both an updated estimation of the student's state as well as a profile describing the recommended training content the student should receive next. This profile will contain a vector of training objectives and will be sent to the lesson/scenario generator 473 to determine the training content. The lesson/scenario generator 473 will consider the training profile recommended by the training intelligence module 472 and dynamically select a module/scenario and (when fully developed) select content from the library stored in the database to construct a lesson plan that best matches this profile. If the lesson generated is computer based training, then the designated module will be presented to the student via the web page server 474, otherwise the student will be notified that they are ready for simulator based training. Once the student arrives at the simulator and is registered, the simulator requests the scenario via the simulation environment interface 475. As the scenario is played, the resulting performance measures will be sent the back over the simulation environment interface 475 and stored in the data store 471 so that they can be used to guide future training. When the student(s) arrive for simulation-based training and are signed in by the instructor at the user interface (of FIG. 11), the simulation environment adapter will query the system for the appropriate scenario and performance measurement information. This information will be used to configure the simulator and an automated measurement module (such as Performance Measurement Engine). As the simulation plays out, the automated measurement module will gather simulation data in real time and send the results over the simulation bus where they will be picked up by the simulation environment adapter and sent to the system for storage.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A computer based method for an adaptive computer based training simulator to automatically determine and communicate a training environment and a training content to a trainee, the method comprising:
   receiving, at an assessment subsystem, a training requirement comprising a training outcome and a training configuration:
      wherein the training outcome is selected from a plurality of predetermined training outcomes, and
      wherein the step of selecting the training outcome from a plurality of predetermined training outcomes comprises:
         selecting a training configuration from a list of predetermined training configurations, and
         each of the predetermined training configurations having a relevancy value to each of the plurality of predetermined training outcomes whereby selecting the training configuration selects the training outcome;
   the training configuration defining a trainee state;
   determining, at the assessment subsystem, a training environment based on a relevancy function of the training environment to the training outcome;
      the relevancy function of the training environment to the training outcome defining a relevancy value for each of the predetermined training outcomes to each of a plurality of the training environments, the step of determining the training environment based on a relevancy function of the training environment to the training outcome comprises selecting the training environment having the highest relevancy value to the training outcome, and wherein the relevancy function of the training environment to the training outcome comprises a best fit curve;

determining, with a training management subsystem, a training content based on a relationship function of the training content to the trainee state;

wherein the relationship function of the training content to the trainee state defining a relationship value for the trainee state to each of a plurality of the training contents, wherein the step of determining the training content based on a relationship function of the training content to the trainee state comprises selecting the training content having the highest relationship value to the trainee state, wherein the highest relationship value to the trainee state is defined by the relationship function of the training content to the trainee state, and wherein the relationship function of the training content to the trainee state comprises a Partially Observable Markov Decision Process (POMDP) model;

determining a training solution comprising the training environment and the training content:

wherein the training solution comprises a computer based training simulator having a training configuration configured to communicate the training environment and the training content to the trainee through a user interface of the computer based training simulator;

communicating the training environment and the training content to the trainee through the user interface of the computer based training simulator;

receiving, through the user interface of the computer based training simulator, a response of the trainee to the training content;

communicating, to the training management subsystem, the response as an observation of the trainee to the training content;

updating, with the training management subsystem, the trainee state to an updated trainee state based on the observation and a relationship function of the trainee state to the observation;

determining, with the training management subsystem, a subsequent training content based on the updated trainee state and the POMDP model;

determining, with the assessment subsystem, a subsequent training environment based on the updated trainee state and a relationship function of the training environment to the trainee state;

communicating the subsequent training environment and the subsequent training content to the trainee through the user interface of the computer based training simulator;

the computer based training simulator having a characteristic of a fidelity of the computer based training simulator; and the relevancy function of the training environment to the training outcome defining a relevancy value for the fidelity of the computer based training simulator to the training outcome.

2. The computer based method of claim 1 wherein the training configuration comprises one selected from a group of predetermined training configurations consisting of:
a platform;
a role and experience;
a training type; and
an experience.

3. The computer based method of claim 1 wherein the training outcome comprises one selected from a group of predetermined training requirements consisting of:
a competency;
a knowledge and skill; and
a training content.

4. The computer based method of claim 1 further comprising:
receiving a performance value of the training solution; and
updating the relationship function of the training content to the trainee state using a machine learning technique and the performance value.

5. A training guidance system for determining a training solution, the training guidance system comprising:
a processor;
a non-transitory computer readable medium having a computer readable program code embodied therein, said computer readable program code configured to be executed to implement the method to automatically determine a training simulator to communicate a training environment and a training content to a trainee of claim 1.

6. The computer based method of claim 1, wherein:
the training environment comprises an interface to a computer based training simulator; and
the training content comprises a computer based scenario presented by the user interface.

7. The computer based method of claim 1 wherein the step of receiving a training requirement comprises receiving a training requirement from a learning management system.

8. The computer based method of claim 1 further comprising:
receiving a performance value of the training solution; and
updating the relevancy function of the training environment to the trainee state using the performance value and a machine learning technique.

9. The training guidance system of claim 5, the training guidance system further comprising:
receiving a performance value of the training solution; and
updating the relevancy function of the training environment to the trainee state using the performance value and a machine learning technique.

10. The computer based method of claim 1 wherein the step of updating, with the training management subsystem, the trainee state to an updated trainee state based on the observation and a relationship function of the trainee state to the observation comprises:
updating the trainee state to an updated trainee state wherein the observation comprises a representation of the response of the trainee;
wherein the relationship function of the trainee state to the observation comprises an observation probability function of O(o|s', a, s') wherein:
o is the observation;
s' is the updated trainee state;
a is the training content; and solving the observation probability function for s' as an output representing the updated trainee state.

11. The computer based method of claim 1 wherein the step of determining, with the training management subsystem, a subsequent training content based on the updated trainee state and a relationship function of the training content to the trainee state comprises:
  determining the subsequent training content based on the updated trainee state wherein
  the relationship function of the training environment to the trainee state comprises a reward function of R(s', a) wherein:
    s' is the updated trainee state;
    a is the training content; and
  determining a reward function value for the updated trainee state given the training content; and
  selecting the training content with a highest reward function value as the subsequent training content.

12. The computer based method of claim 1 wherein the step of determining, with the assessment subsystem, a subsequent training environment based on the updated trainee state and a relationship function of the training environment to the trainee state comprises:
  determining the subsequent training content based on the updated trainee state;
  determining the subsequent training environment based on the relationship function of the training environment to the trainee state; and
  the relationship function of the training environment to the trainee state comprises a best fit curve of the subsequent training configuration to the subsequent training content.

* * * * *